(12) United States Patent
Inoue et al.

(10) Patent No.: US 8,700,553 B2
(45) Date of Patent: Apr. 15, 2014

(54) OPERATION SUPPORT APPARATUS AND OPERATION SUPPORT METHOD

(75) Inventors: Tsuyoshi Inoue, Nara (JP); Jun Ozawa, Nara (JP)

(73) Assignee: Panasonic Corporation, Osaka (JP)

(*) Notice: Subject to any disclaimer, the term of this patent is extended or adjusted under 35 U.S.C. 154(b) by 841 days.

(21) Appl. No.: 12/745,752

(22) PCT Filed: Aug. 26, 2009

(86) PCT No.: PCT/JP2009/004109
§ 371 (c)(1),
(2), (4) Date: Sep. 30, 2010

(87) PCT Pub. No.: WO2010/023886
PCT Pub. Date: Mar. 4, 2010

(65) Prior Publication Data
US 2011/0016072 A1 Jan. 20, 2011

(30) Foreign Application Priority Data
Aug. 28, 2008 (JP) .................. 2008-220142

(51) Int. Cl.
*G06N 5/02* (2006.01)
(52) U.S. Cl.
USPC ........................................ 706/46
(58) Field of Classification Search
USPC ........................................ 706/46
See application file for complete search history.

(56) References Cited

U.S. PATENT DOCUMENTS

| | | | |
|---|---|---|---|
| 7,379,969 B2 | 5/2008 | Osborn, Jr. | |
| 2004/0004811 A1 | 1/2004 | Shimada et al. | |
| 2004/0006460 A1 | 1/2004 | Katayama et al. | |
| 2005/0159141 A1 | 7/2005 | Osborn, Jr. | |
| 2007/0288950 A1* | 12/2007 | Downey et al. | 725/9 |

FOREIGN PATENT DOCUMENTS

| | | |
|---|---|---|
| CN | 1472679 | 2/2004 |
| CN | 1894990 | 1/2007 |
| JP | 8-153004 | 6/1996 |
| JP | 11-231998 | 8/1999 |
| JP | 2005-209024 | 8/2005 |

(Continued)

OTHER PUBLICATIONS

International Search Report issued Dec. 1, 2009 in International (PCT) Application No. PCT/JP2009/004109.

(Continued)

*Primary Examiner* — Kakali Chaki
*Assistant Examiner* — Mai T Tran
(74) *Attorney, Agent, or Firm* — Wenderoth, Lind & Ponack, LLP.

(57) ABSTRACT

An operation support apparatus includes: an operation record storage unit (303) in which an operation record of a user is stored; a target function candidate storage unit (309) which defines and stores target function candidates; an operation strategy determination unit (305) which determines that the user's operation strategy is an operation strategy which originates from content selection, in the case where the operation included in the operation record is a predetermined operation performed when the appliance is in a status in which content can be displayed or selected; a target function inference unit (308) which infers the target function according to a method suited to the operation strategy determined by the operation strategy determination unit (305); and an operation support determination unit (310) which determines an operation support method for the user, using the inferred target function.

17 Claims, 29 Drawing Sheets

(56) References Cited

FOREIGN PATENT DOCUMENTS

| | | |
|---|---|---|
| JP | 2006-209259 | 8/2006 |
| JP | 2006-277290 | 10/2006 |
| JP | 2006-285599 | 10/2006 |
| JP | 2006-313454 | 11/2006 |
| JP | 2008-009573 | 1/2008 |
| JP | 2008-084172 | 4/2008 |
| JP | 2009-080650 | 4/2009 |
| WO | 2008-056548 | 5/2008 |
| WO | 2008/059710 | 5/2008 |

OTHER PUBLICATIONS

H. Adachi et al., "Finding Users' Target Pages Based on Web Access Logs", Information Processing Society of Japan, Technical Report, vol. 9, 2005-HI-112, 2005, pp. 35-42 (with partial English translation).

"ChaSen—Morphological Analyzer", [online] 2007, Nara Institute of Science and Technology, [searched on Aug. 7, 2008]' Internet <URL:http://chasen-legacy.sourceforge.jp/>) (with partial English translation).

Tokunaga, "Information Retrieval and Natural Language Processing", University of Tokyo Press, 1999, pp. 32-33 and 73-77 (with partial English translation).

* cited by examiner

FIG. 1

| Operation Number | Selected Item | Trial Number |
|---|---|---|
| 1 | Select function | 1 |
| 2 | Set scheduled recording from program guide | |
| 3 | Select function | 2 |
| 4 | Other functions | |
| 5 | Set flexible recording | |
| 6 | Set recording time | |
| 7 | Select function | 3 |
| 8 | Search program guide | |
| 9 | Operation support request | |
| ⋮ | ⋮ | ⋮ |

| Operation Number | Selected Item | Trial Number |
|---|---|---|
| 1 | Playback navigation | 1 |
| 2 | Sub menu | |
| 3 | Enter (Select program) | |
| 4 | Select function | 2 |
| 5 | Playback navigation | |
| 6 | Pause | |
| 7 | Sub menu | |
| 8 | List of other images | |
| 9 | Sub menu | |
| 10 | Operation support request | |
| ⋮ | ⋮ | ⋮ |

FIG. 6

| Operation Number 601 | Operation Time 602 | Screen Name (before operation) 603 | Selected-Status Item (before operation) 604 | Operation 605 | Display Level 606 | Trial Number 607 |
|---|---|---|---|---|---|---|
| 1 | 3:00:04 | Television display | None | Select function | 0 | |
| 2 | 3:00:46 | Select function 1 | Playback navigation | Down | 1 | |
| 3 | 3:00:50 | Select function 1 | Set scheduled recording from program guide | Enter | 1 | 1 |
| 4 | 3:00:53 | Program guide | Program on program guide | Down | 2 | |
| 5 | 3:01:08 | Program guide | Program on program guide | Down | 2 | |
| 6 | 3:01:11 | Program guide | Program on program guide | Left | 2 | |
| 7 | 3:01:28 | Program guide | Playback navigation | Select function | 2 | |
| 8 | 3:01:33 | Select function 1 | Set scheduled recording from program guide | Down | 1 | |
| 9 | 3:01:41 | Select function 1 | Check scheduled recording | Down | 1 | 2 |
| 10 | 3:01:46 | Select function 1 | Search program guide | Down | 1 | |
| 11 | 3:01:55 | Select function 1 | Enter G code | Down | 1 | |

FIG. 10

|  | 1001 | 1002 |
|---|---|---|
| | Screen Name | Target Operation |
| | Playback Navigation | Sub menu |
| | | Enter |
| | | Playback |
| | | ⋮ |
| | Program Guide | Sub menu |
| | | Up |
| | | Down |
| | | ⋮ |
| | ⋮ | ⋮ |

FIG. 11

| Screen Name | Operation Target | Type of Operation target |
|---|---|---|
| Television display | Content | Currently broadcast program |
| Playback navigation | Content | Recorded program |
| Program guide | Content | Currently broadcast program, Later broadcast program |
| Installation settings | Recording appliance | Recording appliance |
| HDD format | Storage medium | HDD |
| ⋮ | ⋮ | ⋮ |

| Function Number | Function Description | Used Word | Type of Operation target | Function Execution Procedure |
|---|---|---|---|---|
| 1 | Select television program | Select, Television, Program | Currently broadcast program | Operation 1, Operation 2, ... |
| 2 | Select television program from program guide (G guide) | **** | **** | **** |
| 3 | Display subtitles, superimposed messages | **** | **** | **** |
| 4 | Switch signal of video/audio data | **** | **** | **** |
| 5 | Set program viewing restriction | **** | **** | **** |
| 6 | Record currently broadcast program | **** | **** | **** |
| 7 | Watch data broadcast | **** | **** | **** |
| 8 | Playback MP3 | **** | **** | **** |
| 9 | Set playback method (playback) | **** | **** | **** |
| .. | .. | .. | .. | .. |

| Operation Number | Screen Name | Selected Item | Unselected Item |
|---|---|---|---|
| 2 | Playback Navigation | Sub Menu | Playback |
| | | | Edit Title |
| | | | Delete |
| 7 | Playback Navigation | Sub Menu | Playback |
| | | | Edit Title |
| | | | Delete |
| ⋮ | ⋮ | ⋮ | ⋮ |

Third Rank: Watch currently-recorded program from beginning

Fourth Rank: Select and playback recorded program

Fifth Rank: Scheduled recording at specified recording time

OPERATION SUPPORT APPARATUS AND OPERATION SUPPORT METHOD

TECHNICAL FIELD

The present invention relates to operation support apparatuses and operation support methods for supporting a user operating an appliance which processes content. In particular, the present invention relates to an operation support apparatus and an operation support method capable of supporting a user based on a result of inference of the user's target function using the user's operation records.

BACKGROUND ART

The operation of recent computer application programs, electronic products, and audio/visual (AV) appliances is increasingly complicated together with the implementation of various functions thereof. This makes operation support important for users who do not know how to operate them. For users who do not know how to achieve a target function, a manual may be provided so that they can find out how to operate the target function by themselves. However, finding the target function using the manual is burdensome and time-consuming for the users. To address this circumstance, there is a technique in which a system infers the user's target function when a user makes a support request, using records of the user's operations performed through a trial-and-error process before the support request has been made. Providing operation support based on the result of the inference enables provision of operation support which is less burdensome for users.

As described, a technique is proposed for supporting the user based on the user's operation records. For example, there is a help display apparatus which searches for a function highly related to key input operations that the user has performed through a trial-and-error process, and presents operating instructions regarding that function (see Patent Literature 1, for example). Further, when the inference target is a website, there is a technique for inferring the user's target web page based on a degree of match between words on each web page and words included in a link which the user has selected when moving from a web page to another (see Non Patent Literature 1, for example).

CITATION LIST

Patent Literature

[PTL 1]
Japanese Unexamined Patent Application Publication No. 11-231998

Non Patent Literature

[NPL 1]
Hiroaki ADACHI, Itaru KURAMOTO, Yu SHIBUYA, Yoshihiro TSUJINO, *Finding Users' Target Pages Based on Web Access Logs*, IPSJ (Information Processing Society of Japan) Technical Reports, Vol. 9, 2005-HI112, pp. 35-42 (2005).

SUMMARY OF INVENTION

Technical Problem

The conventional techniques infer the user's target function and target web page using a uniform method which does not take into account the user's operation records. These techniques assume that the user has only one operation strategy (operation approach).

However, in some cases, the user has more than one operation strategy even with the same appliance. For example, to operate AV appliances represented by recording appliances, it is often the case that a predetermined function is used for predetermined content. Therefore, the user's strategies in operating the AV appliances can be classified into two categories based on the order in which the user selects content and a function. One of them is a strategy by which the user selects a function first, and then selects content to which the function is to be applied (hereinafter referred to as "function-selection-driven"). The other is a strategy by which the user selects content first, and then selects a function to be applied to the selected content (hereinafter referred to as "content-selection-driven"). For example, when a recorded program is to be dubbed through a function-selection-driven operation, the dubbing function is selected first, and the recorded program to be dubbed is selected next. On the other hand, with a content-selection-driven operation, the recorded program to be dubbed is selected first, and the dubbing function is selected next.

The user having the function-selection-driven operation strategy starts the selection process by selecting an item which includes words that are most related to the target function. Thus, when the user is in a situation of being unable to access the target function, the user's selection records (records which are, among the operation records, related to function execution or to an operation on content) include many function-related words. Thus, as for the operation records of the user having the function-selection-driven operation strategy, it is effective to use the method, as taught in Non Patent Literature 1, of inferring the target function based on a degree of match between words included in a selected link and words included in each web page.

On the other hand, the user having the content-selection-driven operation strategy cannot access a target function in the following cases, for example. Specifically, the user first selects content, and then tries to execute a target function on that content. However, the user cannot find an adequate function description and thus cannot access the target function. For this reason, the user's selection records do not include many function-related words. Thus, as for the operation records of the user having the content-selection-driven operation strategy, inferring the target function using the technique as taught in Non Patent Literature 1 causes deterioration in the accuracy of the target function inference.

FIGS. 1 and 2 show examples of specific selection records. The operation records shown in FIG. 1 are selection records which are based on the function-selection-driven operation strategy; and the operation records shown in FIG. 2 are selection records which are based on the content-selection-driven operation strategy. Whereas the operation records of FIG. 1 include function-related words, such as "recording" and "scheduled recording", the operation records of FIG. 2 include many words that are not directly linked with functions, such as "sub menu". Thus, there is a problem that even when the content-selection-driven operation records as shown in FIG. 2 are used for inferring the target function, the accuracy of the inference is not high.

The present invention has been conceived to solve the above problem. It is an object of the present invention to provide an operation support apparatus and an operation support method capable of increasing the accuracy of the target function inference and providing a more appropriate support to the user by inferring the target function according to the user's operation strategy.

Solution to Problem

An operation support apparatus according to an aspect of the present invention is an operation support apparatus which provides a user with operation support by inferring a target function of the user which is to be executed on an appliance that processes content, the operation support apparatus including: an operation record storage unit in which an operation record is stored, the operation record including an operation performed by the user on the appliance; a target function candidate storage unit in which functions of the appliance are stored; an operation strategy determination unit configured to determine on which one of operation strategies the operation on the appliance included in the operation record stored in the operation record storage unit is based on, the operation strategies having mutually different selection bases on which the user has focused in selecting the operation on the appliance; a target function inference unit configured to infer, with reference to the functions of the appliance stored in the target function candidate storage unit, the target function of the user according to a target function inference method suited to the operation strategy determined by the operation strategy determination unit; and an operation support determination unit configured to determine an operation support method which allows the user to achieve the target function inferred by the target function inference unit, and to provide the user with operation support according to the determined operation support method.

This structure makes it possible to determine the user's operation strategy based on the user's operation record, and to change the method of inferring the target function based on the determination result. With this, it becomes possible to suppress the deterioration in the inference accuracy attributable to the user's operation strategy, and to enable more accurate target inference.

It is to be noted that the present invention can be realized not only as an operation support apparatus which includes such characteristic processing units, but also as an operation support method which includes, as steps, the characteristic processing units included in the operation support apparatus. In addition, the present invention can also be realized as a program which causes a computer to execute the characteristic steps included in the operation support method. It is apparent that such a program can be distributed via a recording medium such as a Compact Disc-Read Only Memory (CD-ROM) or a communication network such as the Internet.

Advantageous Effects of Invention

As described above, with the operation support apparatus according to the present invention, even when users having different operation strategies operate the same appliance, it is possible to change the method of inferring a target function according to the respective users' operation strategies. This enables more accurate inference of the target function, thereby allowing provision of an appropriate operation support for users having their respective operation strategies.

BRIEF DESCRIPTION OF DRAWINGS

FIG. 1 shows examples of operation records stored in an operation record storage unit according to an embodiment of the present invention.

FIG. 2 shows examples of operation records stored in an operation record storage unit according to an embodiment of the present invention.

FIG. 6 shows examples of operation records stored in an operation record storage unit according to an embodiment of the present invention.

FIG. 10 shows an example of data which associates screens and operations according to an embodiment of the present invention.

FIG. 11 shows an example of data which is stored in an operation target information storage unit according to an embodiment of the present invention and which defines an operation target to be operated on each screen.

FIG. 12 shows an example of target function candidate information stored in a target function candidate storage unit according to an embodiment of the present invention.

FIG. 26 shows an example of information about unselected items stored in an operation record storage unit according to Variation 3 of an embodiment of the present invention.

DESCRIPTION OF EMBODIMENTS

Embodiment 1

Hereinafter, an embodiment of the present invention is described with reference to the drawings.

The present embodiment describes a method of providing support when a user using a recording appliance is unable to access a target function and makes an operation support request, by inferring the user's target function based on selection records that show which menu items and buttons have been selected so far.

Figure 3:
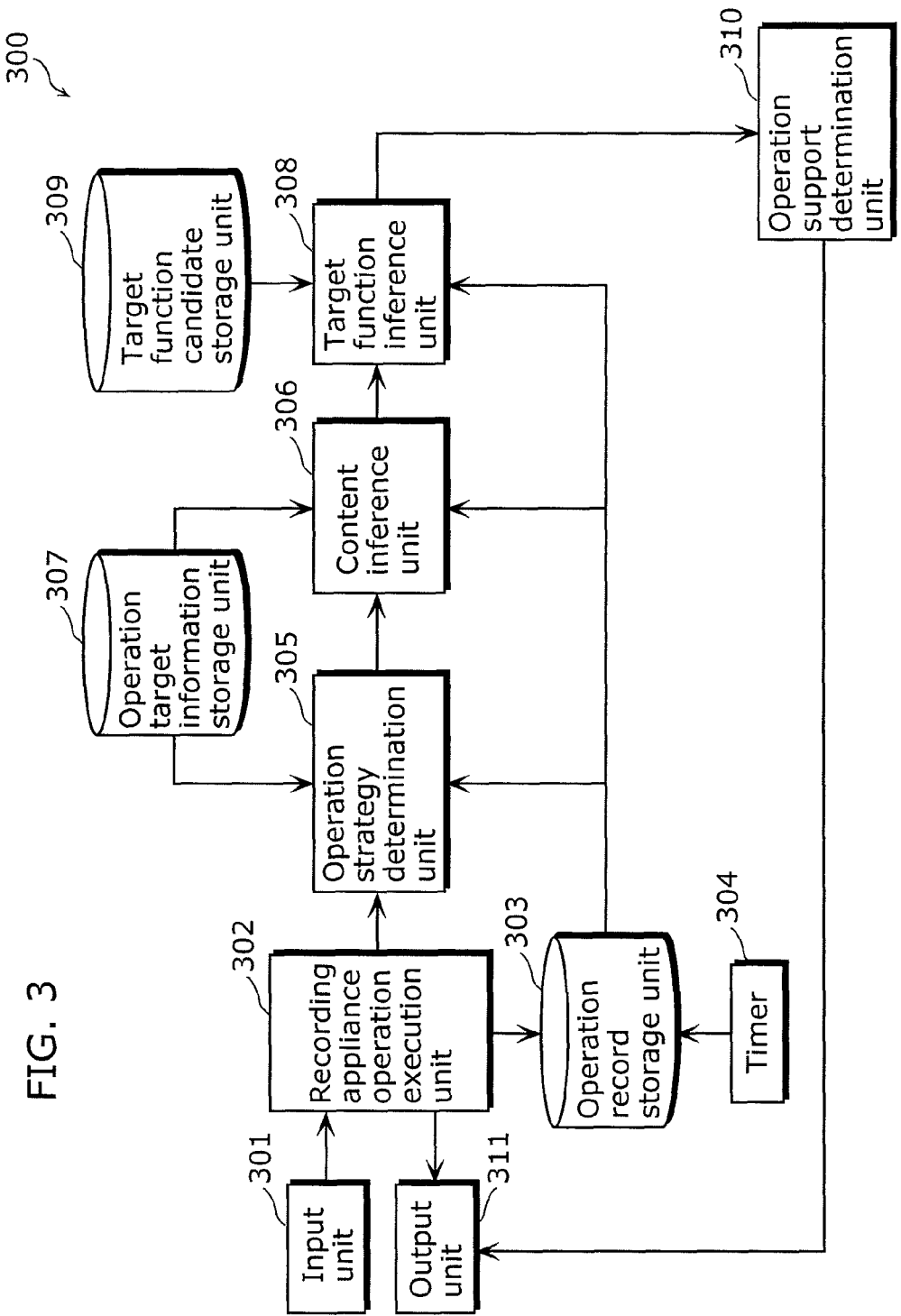
FIG. 3 is a block diagram showing a structure of an operation support apparatus according to an embodiment of the present invention.

FIG. 3 is a block diagram showing a functional structure of an operation support apparatus according to the present embodiment of the present invention.

An operation support apparatus 300 is an apparatus which supports a user operating a recording appliance which records a television program. The operation support apparatus 300 includes an input unit 301, a recording appliance operation execution unit 302, an operation record storage unit 303, a timer 304, an operation strategy determination unit 305, and a content inference unit 306. The operation support apparatus 300 further includes an operation target information storage unit 307, a target function inference unit 308, a target function candidate storage unit 309, an operation support determination unit 310, and an output unit 311. It is to be noted that the recording appliance may be provided in the operation support apparatus 300 or may be provided separately from the operation support apparatus 300.

The input unit 301 includes a remote control, a touch screen, or the like, and is a processing unit which receives from the user an operation input that is input of an operation performed on the recording appliance.

The recording appliance operation execution unit 302 is a processing unit which executes an operation of the recording appliance in response to the user's operation input received by the input unit 301.

The operation record storage unit 303 is a storage device for storing an operation record which associates the operation input received by the input unit 301 with time information and the recording appliance's status at the time of the input.

The timer 304 is a timer capable of measuring time.

The operation strategy determination unit 305 is a processing unit which determines, using operation records stored in the operation record storage unit 303, whether the user's operation strategy is the function-selection-driven operation strategy or the content-selection-driven operation strategy.

The content inference unit 306 is a processing unit which infers, when the user's operation strategy is the content-selection-driven operation strategy, the type of content which is an operation target to be operated by the user, by using the operation records stored in the operation record storage unit 303.

The operation target information storage unit 307 is a storage device for storing information indicating an association between the recording appliance's status, an operation target in the recording appliance's status, and a detailed type of the operation target. This information is used by the operation strategy determination unit 305 for determining the operation strategy and by the content inference unit 306 for inferring the type of content which is an operation target.

The target function candidate storage unit 309 is a storage device for storing information about functions which are candidates of a target function that is to be inferred (hereinafter such information is referred to as "target function candidate information" and such functions are referred to as "target function candidates").

The target function inference unit 308 is a processing unit which infers the user's target function. More specifically, the target function inference unit 308 ranks the target function candidates mentioned above, using the inferred type of content, the operation records, and the target function candidate information stored in the target function candidate storage unit 309. The target function inference unit 308 provides the ranking result as the inference result.

The operation support determination unit 310 is a processing unit which determines, based on the ranking of the functions, an operation support method suited to the user.

The output unit 311 is a display unit which displays: a result of the operation of the recording appliance executed by the recording appliance operation execution unit 302; and the operation support method determined by the operation support determination unit 310. For example, the output unit 311 is a display of a television set. It is to be noted that the display unit that displays the execution result of the operation of the recording appliance may be different from the display unit that displays the determined operation support method. For example, the former may be displayed on a television screen, and the latter may be displayed on a display of a mobile phone.

The following describes an example of processing of the operation support apparatus 300 having the above-described structure. More specifically, the following describes processing for providing operation support when a user operating a recording appliance is unable to access a target function and makes an operation support request, by inferring the user's target function based on selection records that show which menu items and buttons have been selected so far.

Figure 4:
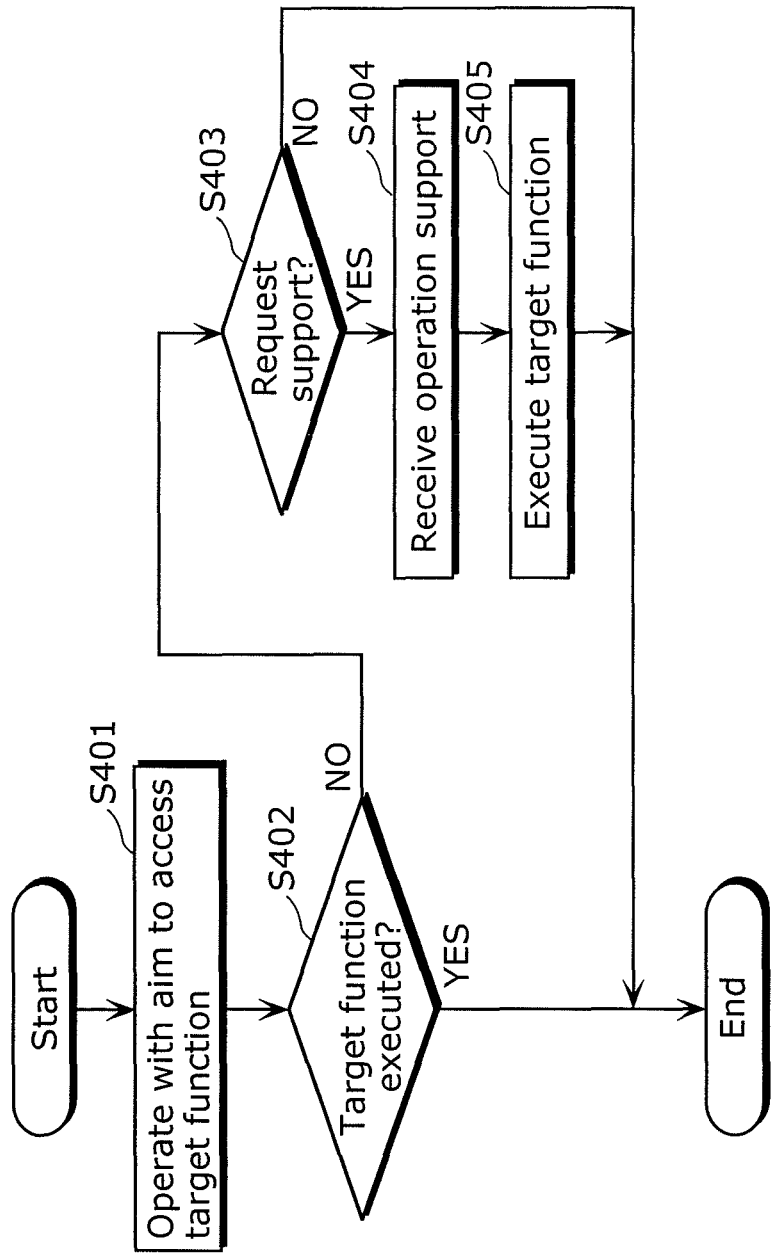
FIG. 4 is a flowchart showing a main operation of a user according to an embodiment of the present invention.
Figure 5:
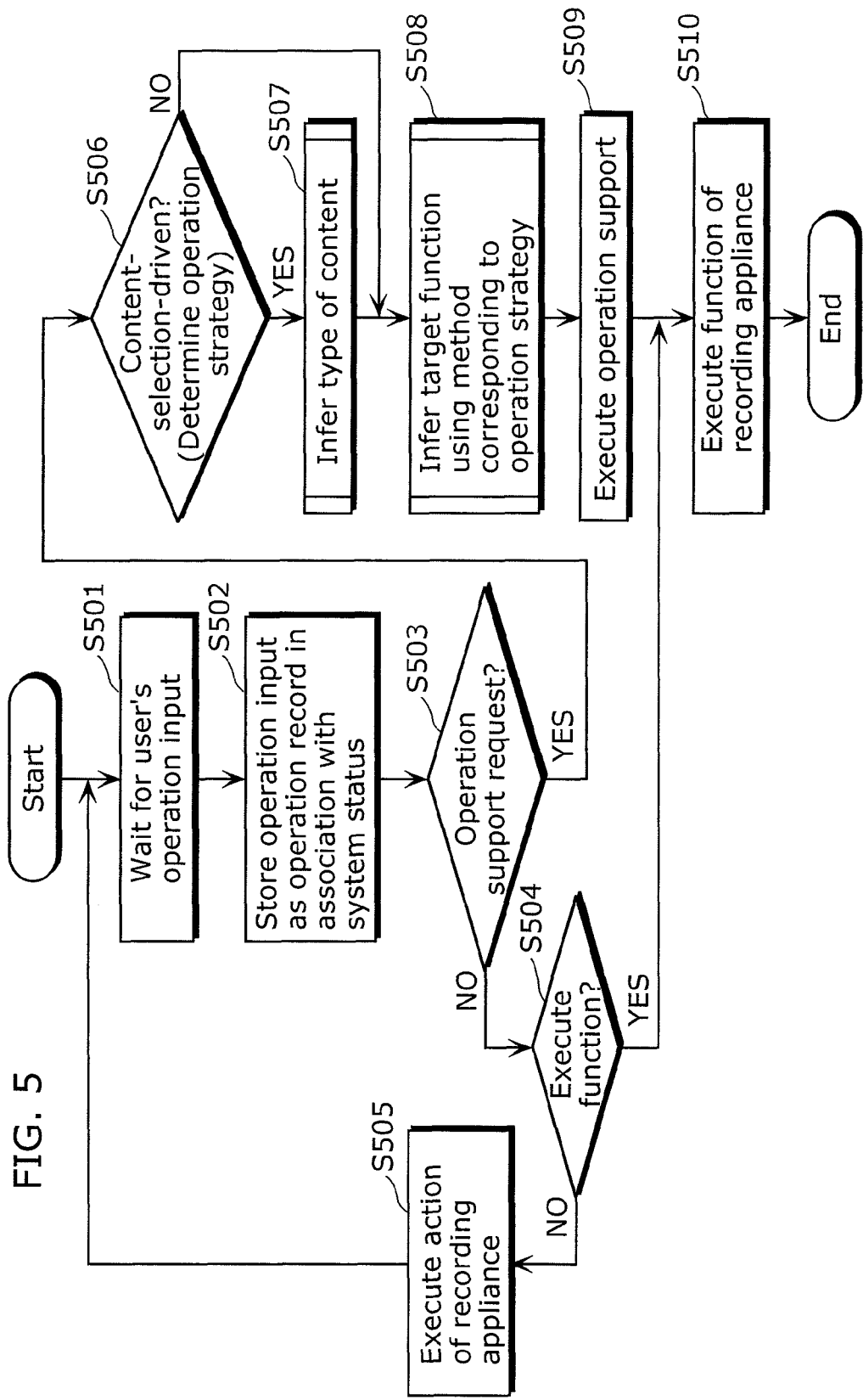
FIG. 5 is a flowchart showing main processing of an operation support apparatus according to an embodiment of the present invention.

FIG. 4 is a flowchart showing an operation procedure of the user. FIG. 5 is a flowchart showing a processing procedure of the operation support apparatus 300.

First, the user's basic actions are described with main focus on FIG. 4.

The user operates the recording appliance with an aim to access a target function (S401).

The user can execute the target function without any troubles if the user knows the operation procedure for executing the target function. Even if the user does not know the operation procedure, the user can execute the target function in some cases by selecting a button on the remote control or a menu item displayed on the screen which the user thinks is correct. That is to say, the user can execute the target function when the operation procedure which the user expects to be correct for executing the target function matches the operation procedure designed for that function by the system developers. If the user executes the target function without receiving operation support (YES in S402), no processing is performed on the operation support apparatus 300.

However, the user cannot access and execute the target function when the operation procedure that the user expects to be correct for executing the target function is different from the operation procedure designed for that function by the system developers.

If the user cannot execute the target function and requests support (NO in S402 and YES in S403), the user receives operation support from the operation support apparatus 300 (S404). With the operation support from the operation support apparatus 300, the user accesses and executes the target function (S405).

On the other hand, if the user cannot execute the target function but does not request the operation support apparatus 300 to provide support (NO in S402 and NO in S403), the user finishes the operation without executing the target function.

It is to be noted that with the above user's basic actions, it is assumed that the operation support apparatus 300 provides operation support in response to the user's operation support request. However, the timing of providing operation support from the operation support apparatus 300 is not particularly limited to the user's request. For example, the operation support apparatus 300 determines, based on the user's operation records, whether or not the user is confused. In the case of determining that the user is confused, the operation support apparatus may automatically provide operation support or suggest receiving operation support.

Next, the following describes the processing executed by the operation support apparatus 300, with main reference to the structural diagram in FIG. 3 and the flowchart in FIG. 5.

The recording appliance operation execution unit 302 waits for the user's operation input from the input unit 301 (S501).

The recording appliance operation execution unit 302 stores the user's operation input received from the input unit 301 in the operation record storage unit 303 as an operation record, in association with time information and the recording appliance's status at the time of the input (S502).

Here, specific examples of the operation records stored in the operation record storage unit 303 are shown in FIG. 6. Each operation record includes an operation number 601, an operation time 602, a screen name 603, a selected-status item 604, an operation 605, a display level 606, and a trial number 607.

Figures 7, 8:
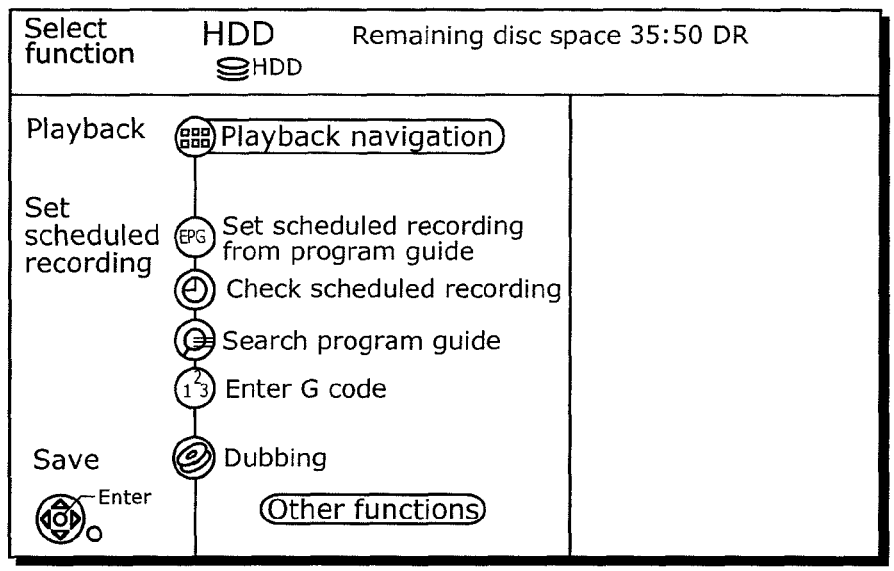
FIG. 7 shows an example screen of a recording appliance according to an embodiment of the present invention.
FIG. 8 shows an example screen of a recording appliance according to an embodiment of the present invention.

The operation number 601 is a serial number assigned to each operation. The operation number 601 is reset with predetermined timing, such as when the recording appliance is activated or when the user's target function is executed. The operation time 602 indicates a time at which the user has performed an operation input. The screen name 603 indicates a screen name assigned to a screen displayed before the user performs an operation input. Here, the screen name is the name of a screen displayed when the user operates the recording appliance. For example, the screen name "select function 1" is a name assigned to a menu screen as shown in FIG. 7. The screen name "playback navigation" is a name assigned to a screen showing a list of recorded content as shown in FIG. 8.

The selected-status item 604 is a name of an item which is in selected status before the user performs an operation. The operation 605 is an operation performed by the user and indicates a button selected on the remote control. The display level 606 indicates at which menu level the operation 605 has been performed. For example, assuming level 0 as the status in which the screen of the recording appliance in activated status is not displayed, level 1 is defined as the status in which the screen is displayed through pressing of a button, and level 2 is defined as the status in which another screen is displayed through the user's another operation on the screen displayed in level 2. The trial number 607 is a number for identifying a trial. A trial represents a series of operations. In the present embodiment, a trial represents a series of operations performed until the user performs a search again by returning to a higher level because descending the menu levels did not lead to the target function. In the example of FIG. 6, up to the operation number 6, the user performs a search on a program guide screen by pressing the cursor key. However, the user judges that the target function cannot be accessed on the program guide screen and thus performs a search again by pressing the "select function" button. Therefore, operations starting from the operation number 7 are determined as another trial.

Figure 9:
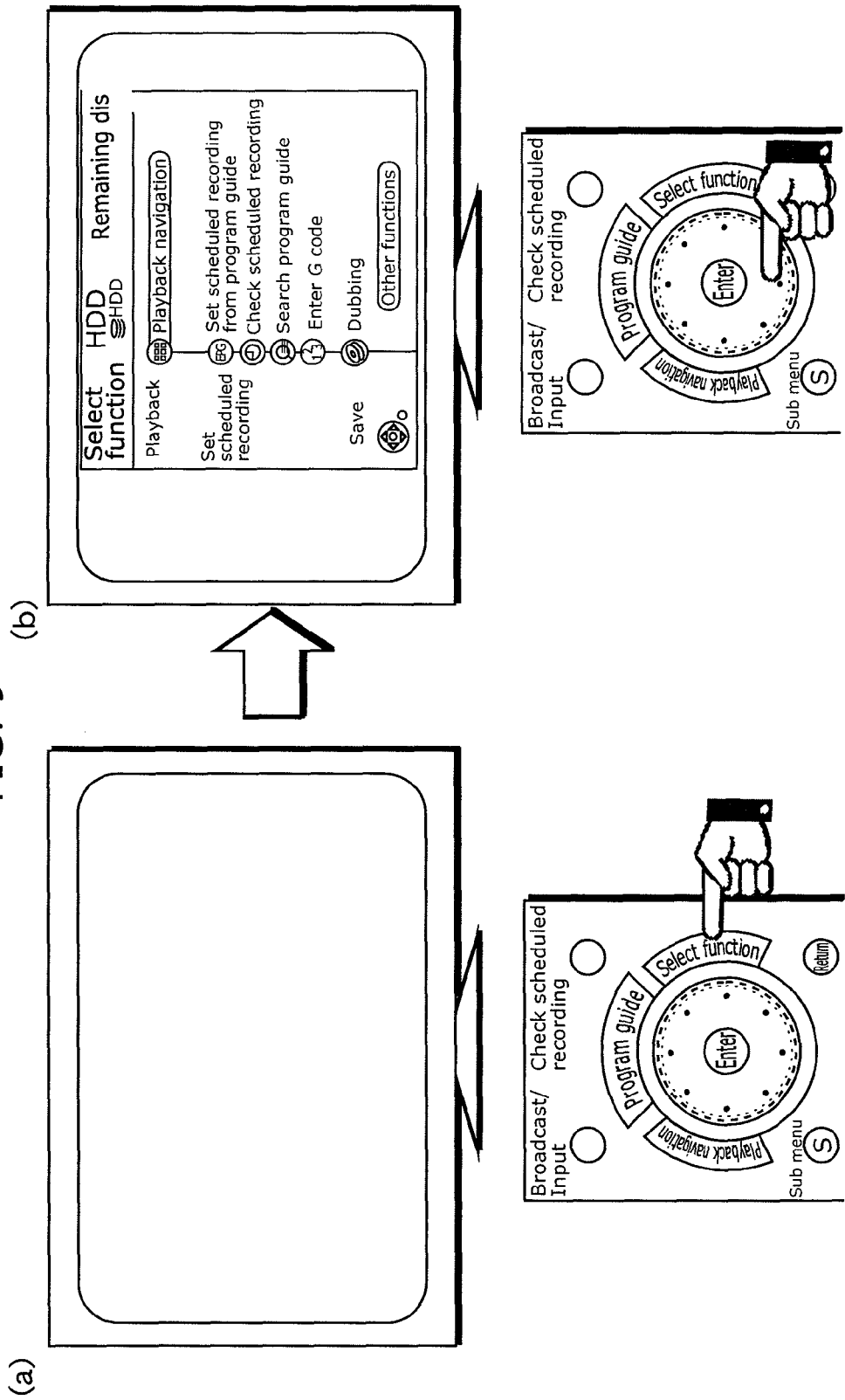
FIG. 9 shows a change in screen corresponding to an operation record according to an embodiment of the present invention.

The following describes the user's operations in more detail, using some of the operation records shown in FIG. 6. The operation number 1 indicates the user's operation, on a "television display" screen, of pressing the "select function" button on the remote control. The "television display" screen does not display the recording appliance screen, and thus the display level is 0. Further, since the operation screen of the recording appliance is not displayed, the selected-status item 604 indicates "none". The part (a) of FIG. 9 shows an example of the user's remote control operation and the television display screen according to the operation number 1.

The operation number 2 indicates the user's operation of pressing the "down" button on the remote control, on the "select function 1" screen (shown in FIG. 7) which is displayed as a result of the pressing of the "select function" button on the remote control in the operation of the operation number 1. The "select function 1" screen displayed as a result of the pressing of the "select function" button is a menu screen which shows, as shown in FIG. 7, the item "playback navigation" at the top, followed by "set scheduled recording from program guide", "check scheduled recording", and so on. When the "function selection 1" screen (menu screen) is displayed, the top item "playback navigation" is in the selected status. Pressing the "down" button on the remote control puts the next item below (i.e., "set scheduled recording from program guide") in the selected status on the menu screen. This is the user's operation in the operation number 2. The part (b) of FIG. 9 shows an example of the user's remote control operation and the television display screen according to the operation number 2.

FIGS. 1 and 2 show other operation records which are obtained by extracting, from the operation records as shown in FIG. 6, only the items selected by the user.

Each of the operation records shown in FIGS. 1 and 2 includes an operation number 101, a selected item 102, and a trial number 103. The operation number 101 is a number corresponding to the operation number 601 in the operation records shown in FIG. 6. The selected item 102 indicates an item selected by the user, among the selected-status items 604 in the operation records shown in FIG. 6. The selected item 102 is obtained by determining, using screen information indicated by the screen name 603, whether or not the user has selected an item on the screen and whether or not the user has selected an item on a remote control button, i.e., a label assigned to a remote control button. In other words, selected-status items 604 which indicate results of such selections are determined as the selected items 102. For example, the user's selection of the "up" or "down" button on the screen showing menu options is an operation for moving the cursor to a target item. Thus, neither "up" nor "down" is a selected item. However, when the user moves the cursor to the target item and presses the "enter" button, the operation support apparatus 300 obtains, not the "enter" that is the label of the button, but the item selected from the menu, as the selected item. More specifically, what are obtained are selected-status items 604 for which the user has pressed the "enter" button in the operations 605 in the operation records shown in FIG. 6. The trial number 103 is a number corresponding to the trial number 607 in the operation records shown in FIG. 6. Instead of the operation records formatted in a manner shown in FIG. 6, the operation records formatted in a manner shown in FIGS. 1 and 2 may be stored in the operation record storage unit 303.

The recording appliance operation execution unit 302 determines whether or not the operation input received from the input unit 301 is an operation support request (S503). The operation support request is made when, for example, the user presses a help button on the remote control.

If the operation input is not an operation support request (NO in S503), the recording appliance operation execution unit 302 determines whether or not the operation input is an operation for executing a function (S504). If the operation input is an operation for executing a function (YES in S504), the recording appliance operation execution unit 302 executes the function of the recording appliance (S510). On the other hand, if the operation input is not an operation for executing a function (NO in S504), the recording appliance operation execution unit 302 executes an action of the recording appliance (S505) and returns to S501 to wait for an operation input from the user.

If the operation input received from the input unit 301 is an operation support request (YES in S503), the operation support apparatus 300 extracts, as described below, operation records of operations that the user is thought to have performed through a trial and error process in an attempt to execute the target function. Further, the operation support apparatus 300 infers the user's target function using the extracted operation records, and performs processing for providing operation support. Here, the operation records of operations that the user is thought to have performed through a trial and error process are, for example, operation records starting from an operation subsequent to a recent operation record of executing a function, up to an operation record of making an operation support request.

First, the operation strategy determination unit 305 determines, using the operation records stored in the operation record storage unit 303, whether the user's operation strategy is the content-selection-driven operation strategy or the function-selection-driven operation strategy (S506).

Here, the following describes three methods ((I) to (III)) of performing the operation strategy determination process (S506).

(I) Method of Performing the Operation Strategy Determination Process (S506) (1)

Described first is a method by which the operation strategy determination unit 305 determines whether or not the user's operation strategy is the content-selection-driven operation strategy and determines that the user's operation strategy is the function-selection-driven operation strategy when it determines that the user's operation strategy is not the content-selection-driven operation strategy.

The operation strategy determination unit 305 determines whether or not the user's operation strategy is the content-selection-driven operation strategy, using: data which associates screens and operations as shown in FIG. 10; and data (hereinafter referred to as "screen-operation target data") which defines an operation target to be operated on each screen as shown in FIG. 11, both of which are stored in the operation target information storage unit 307.

The data shown in FIG. 10 includes a screen name 1001 and a target operation 1002. This data is used for determining, when the user has performed an operation indicated by the target operation 1002 on the screen indicated by the screen name 1001, that the user has performed the operation on the screen indicated by the screen name 1001.

As shown in FIG. 11, the screen-operation target data includes a screen name 1101, an operation target 1102, and a type of operation target 1103. For example, the record in the first row shows that the operation target on the "television display" screen is content, and that the type of the content is a currently broadcast program. The operation target 1102 and the type of operation target 1103 may be pre-defined by the system developers or may be automatically extracted from the recording appliance manual.

The operation strategy determination unit 305 obtains, from the operation records extracted from the operation record storage unit 303 to be used for inferring the target function, the screen which had been displayed when the user has performed an operation and the operation that the user has performed on that screen. The operation strategy determination unit 305 compares the obtained operation with the screen-operation target data to determine whether the user's operation target is content or not. If the user's operation target is content, the operation strategy determination unit 305 determines that the user's operation strategy is the content-selection-driven operation strategy. For example, in the operation numbers 4 to 6 of the operation records shown in FIG. 6, the user has performed operations to move the cursor down or left on the program guide screen. First, the operation strategy determination unit 305 determines, based on the data shown in FIG. 10, that the user is performing the operations on the "program guide". Next, based on the screen-operation target data in FIG. 11, it is possible to determine that the operation target on the program guide is content. Therefore, the operation strategy determination unit 305 determines that the user's operation strategy is the content-selection-driven operation strategy. If the operation target obtained based on the operation records used for the target function inference is not content, the operation strategy determination unit 305 determines that the user's operation strategy is the function-selection-driven operation strategy.

(II) Method of Performing the Operation Strategy Determination Process (S506) (2)

Described next is a method by which the operation strategy determination unit 305 determines whether or not the user's operation strategy is the function-selection-driven operation strategy and determines that the user's operation strategy is the content-selection-driven operation strategy when it determines that the user's operation strategy is not the function-selection-driven operation strategy.

This determination method makes use of the characteristics that an item selected with the function-selection-driven operation strategy includes many words representing operations of the recording appliance and that many such words are also included in a document in the manual explaining functions.

First, the operation strategy determination unit 305 extracts the user's selection records as shown in FIGS. 1 and 2 stored in the operation record storage unit 303, and performs a morphological analysis on the selected items 102.

Next, the operation strategy determination unit 305 extracts the number of words of a particular word class from the result of the morphological analysis. The particular word class is, for example, noun in Japanese which becomes verb when "suru" is added, such as "channel selection" and "settings" which are often used for describing functions.

Then, the operation strategy determination unit 305 calculates a ratio of the extracted number of words of the particular word class to the number of operation records prior to the operation support request. Specifically, in the selection records shown in FIG. 1, the number of operation records prior to the operation support request is eight. In the case where the number of words of the particular word class in the selected items 102 of the selection records in FIG. 1 is twelve, the ratio is obtained by dividing twelve by eight, which gives 1.5.

If the ratio is equal to or greater than a threshold, the operation strategy determination unit 305 determines that the user's operation strategy is the function-selection-driven operation strategy, and if the ratio is smaller than the threshold, the operation strategy determination unit 305 determines that the user's operation strategy is the content-selection-driven operation strategy.

(III) Method of Performing the Operation Strategy Determination Process (S506) (3)

As another technique, the operation strategy determination unit 305 extracts, from the result of the above-mentioned morphological analysis, morphemes of a particular word class. The operation strategy determination unit 305 calculates the frequency of appearance of the morphemes in a document in the manual explaining functions. The operation strategy determination unit 305 determines that the user's operation strategy is the function-selection-driven operation strategy if the frequency is equal to or greater than a predetermined threshold. If the frequency is smaller than the predetermined threshold, the operation strategy determination unit 305 determines that the user's operation strategy is the content-selection-driven operation strategy. For example, an average of the appearance frequencies of the respective morphemes of a particular word class in the manual may be used as the above frequency. Furthermore, an average of the numbers of functions which are described in the manual and in which the respective morphemes of a particular word class appear may be used as the above frequency.

It is to be noted that the determination method in (II) and (III) above are based on the idea of determining the operation strategy based on the appearance tendency of a word or phrase, and the unit of the word or phrase is not limited to a morpheme and may be a word or collocation, for example. That is to say, without performing the morphological analysis, a particular word or phrase is extracted from the user's selection records using a dictionary, a word or phrase list, or the like which is commonly used or has been created by the system developers. The operation strategy may be determined through a determination process using: the appearance frequency of the extracted particular word or phrase; and the threshold as mentioned above. Here, although the above example has extracted a word or phrase with a focus on a word class, a word or phrase included in the created dictionary or word or phrase list may be extracted so as to determine the operation strategy based on the appearance frequency of the extracted word or phrase.

Using one of the determination methods in (I) to (III), the operation records shown in FIG. 1, for example, are determined as operation records of a user having the function-selection-driven operation strategy. Further, the operation records shown in FIG. 2 are determined as operation records of a user having the content-selection-driven operation strategy.

It is to be noted that the operation strategy determination (S506) may be performed not on an operation record-by-operation record basis but on a trial-by-trial basis. For example, it is assumed that the user has performed the operations up to the operation number 8 in FIG. 1 and has subsequently performed the operations shown in FIG. 2. In this case, the operation strategy determination unit 305 determines that the first three trials are based on the function-selection-driven operation strategy, whereas the last two trials are based on the content-selection-driven operation strategy.

If it is determined that the user's operation strategy is not the content-selection-driven operation strategy, that is, if it is determined that the user's operation strategy is the function-selection-driven operation strategy (NO in S506), the content inference unit 306 infers the target function using a target function inference method corresponding to the function-selection-driven operation strategy (S508). The details of the target function inference (S508) are described later.

On the other hand, if it is determined that the user's operation strategy is the content-selection-driven operation strategy (YES in S506), the content inference unit 306 infers the type of content (S507). More specifically, the content inference unit 306 infers the type of content using the information, which was obtained during the operation strategy determination (S506), about the screen which had been displayed when the user has performed an operation. More specifically, the content inference unit 306 refers to the screen-operation target data to obtain the type of operation target associated with the information about the screen. For example, the operation records shown in FIG. 6 show that the user has performed operations on the "program guide" screen. Based on this information, it is inferred that the type of the content on which the target function is to be executed is either "currently broadcast program" or "later broadcast program" based on the type of operation target 1103 indicated in the screen-operation target data shown in FIG. 11.

The target function inference unit 308 uses the operation records stored in the operation record storage unit 303 and the type of content inferred by the content inference unit 306. Using such operation records and type of content, the target function inference unit 308 determines the target function candidates from among the functions indicated in the target function candidate information stored in the target function candidate storage unit 309 (S508). The details of the target function inference (S508) are described later.

FIG. 12 shows a specific example of the target function candidate information stored in the target function candidate storage unit 309. The target function candidate information includes a function number 1201, a function description 1202, a used word 1203, a type of operation target 1204, and a function execution procedure 1205. The function number 1201 is a number of each function. The function description 1202 is a description of each function, and is a sentence briefly describing a function as in the table of contents of the manual. The used word 1203 is a word used for explaining each function in the manual. The used word 1203 is obtained by performing a morphological analysis on a text document in the manual and extracting, from morphemes, only the morphemes of a particular word class such as noun, verb, or adverb. The type of operation target 1204 indicates a type of an operation target at the time of executing a function, and corresponds to the type of operation target 1103 included in the screen-operation target data shown in FIG. 11. The function execution procedure 1205 indicates an operation procedure necessary for executing a function. For example, the function execution procedure 1205 of the function having the function number 1201 of "1" indicates "Perform Operation 1, then Operation 2, and . . . ". In the case where there are multiple execution procedures for one function, all of the execution procedures are stored. Further, information indicating whether each execution procedure is based on the function-selection-driven operation strategy or the content-selection-driven operation strategy may be added for use in providing the operation support.

Figure 13:
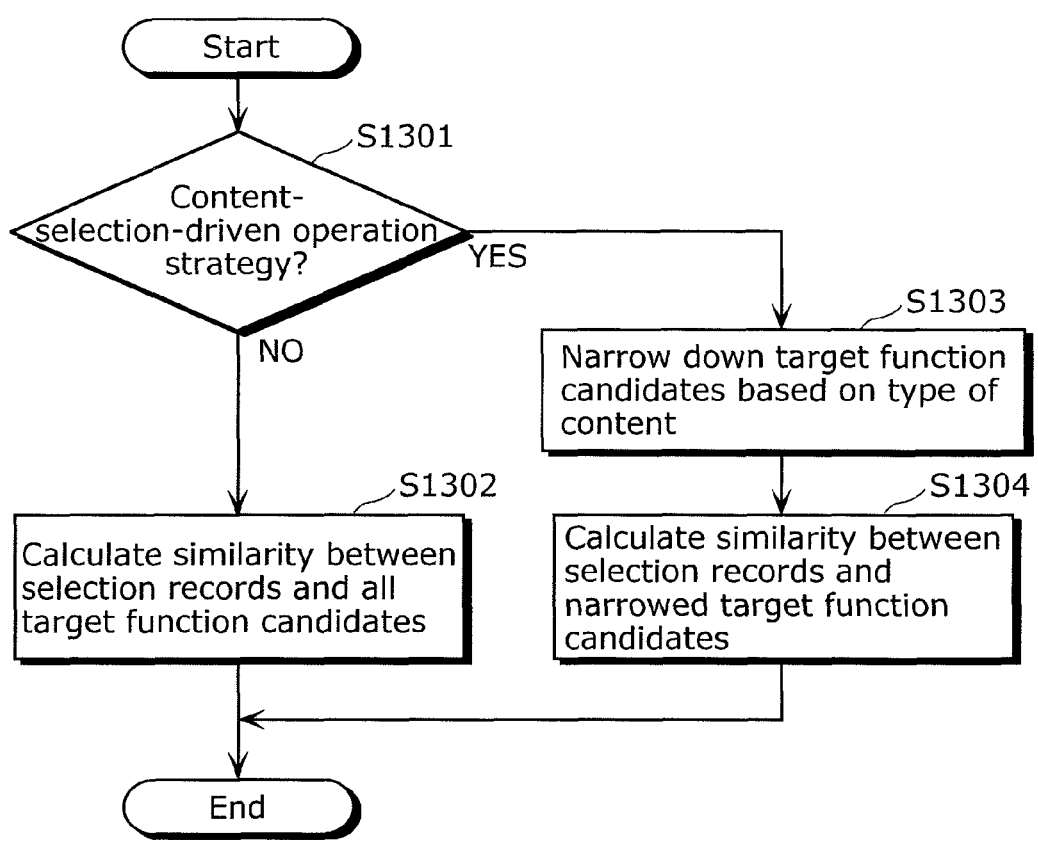
FIG. 13 is a flowchart showing processing of a target function inference unit according to an embodiment of the present invention.

Next, the target function inference (S508 in FIG. 5) is described in detail. FIG. 13 is a detailed flowchart of the target function inference (S508 in FIG. 5).

The target function inference unit 308 determines whether or not the user's operation strategy is the content-selection-driven operation strategy based on the determination result of the operation strategy determination unit 305.

If it is determined that the user's operation strategy is the function-selection-driven operation strategy (NO in S1301), the target function inference unit 308 calculates a similarity between the user's selection records and each of the functions indicated in the target function candidate information stored in the target function candidate storage unit 309. The target function inference unit 308 ranks each function based on the similarity (S1302).

The similarity between the user's selection records and each function is calculated using a similarity between words included in a selection record and words used for explaining a function (used word 1203). The simplest way is to count the number of common words and calculate a similarity which increases with increase in the number of the common words. Further, with each function treated as a set of documents, a term-document matrix is created to represent each function as a function vector and represent the selection records as a search query vector. After that, a similarity between the function vector and the search query vector may be calculated.

When the similarity is greater, it is inferred that the function is more likely to be the user's target function. Thus, the similarity is hereinafter referred to as an inference score.

On the other hand, if it is determined that the user's operation strategy is the content-selection-driven operation strategy (YES in S1301), the target function inference unit 308 narrows down the target function candidates based on the type of content (S1303). As previously described, this is to deal with the deterioration of the inference accuracy caused when the similarity is calculated using only the words mentioned in S1302, because the operation records based on the content-selection-driven operation strategy are less likely to include function-related words. This narrowing-down processing reduces the number of target function candidates based on the type of content that the user is to operate on, so that the inference accuracy can be improved.

More specifically, the target function inference unit 308 makes a comparison between the type of content obtained from the content inference unit 306 and the type of operation target 1204 included in the target function candidate information shown in FIG. 12. The target function inference unit 308 handles a function which indicates a match in the above comparison as a target function candidate. When more than one type of content is obtained from the content inference unit 306, the target function inference unit 308 handles all the functions which indicate a match in the above comparison as target function candidates.

The target function inference unit 308 calculates the similarity between the user's operation records and each of the target function candidates narrowed down in S1303, and ranks each function (S1304). The similarity is calculated using the same method as in S1302.

Figure 14:
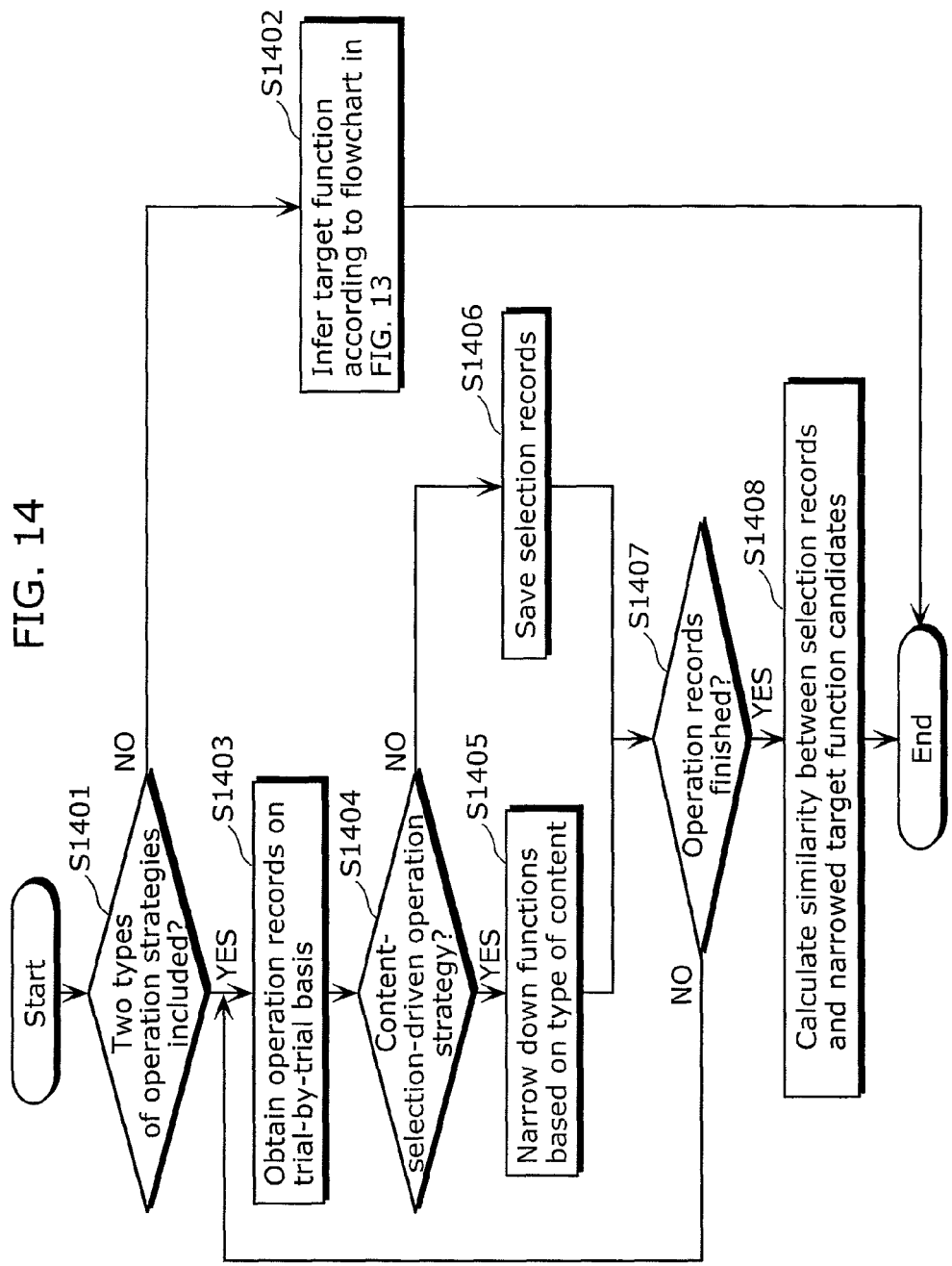
FIG. 14 is a flowchart showing processing of a target function inference unit according to an embodiment of the present invention.

In the case where the operation strategy determination unit 305 performs the operation strategy determination on a trial-by-trial basis, the target function inference (S508 in FIG. 5, FIG. 13) by the target function inference unit 308 may be performed on the trial-by-trial basis. FIG. 14 is a flowchart of processing for inferring the target function on a trial-by-trial basis.

This processing aims to further improve the accuracy when the user has a different operation strategy for each trial, by inferring the target function using the characteristics of each operation strategy. More specifically, inferring content using content-selection-driven operation records allows reduction in the number of target function candidates, thereby enabling improvement in the accuracy of the target function inference. However, the content-selection-driven operation records include many operations performed for accessing content, which could adversely affect the accuracy of the target function inference. In view of the above, in this processing, the target function candidates are narrowed down using the content-selection-driven operation records, and then a similarity is calculated between each of the narrowed-down target function candidates and the function-selection-driven operation records to thereby rank the functions.

The target function inference unit 308 determines whether the operation records to be used for the target function inference include both the content-selection-driven operation strategy and the function-selection-driven operation strategy (S1401). If it is determined that only one of the operation strategies is included (NO in S1401), the target function inference shown in FIG. 13 is performed (S1402).

On the other hand, if it is determined that both operation strategies are included (YES in S1401), the target function inference unit 308 obtains operation records from the operation record storage unit 303 on a trial-by-trial basis (S1403).

Regarding the operation records obtained on a trial-by-trial basis in S1403, the target function inference unit 308 determines whether or not the user's operation strategy for the operation records is the content-selection-driven operation strategy (S1404). For this determination, the result of the operation strategy determination (S506 in FIG. 5) is used.

If it is determined that the user's operation strategy in the currently-considered trial is the content-selection-driven operation strategy (YES in S1404), the target function inference unit 308 performs the function narrowing-down processing. More specifically, the target function inference unit 308 narrows down the target function candidates for the currently-considered trial, using the type of content inferred by the content inference unit 306 (S1405). This narrowing-down processing is the same as the narrowing-down processing described with reference to FIG. 13 (S1303 in FIG. 13). Thus, the detailed description thereof is not repeated here.

On the other hand, if it is determined that the user's operation strategy in the currently-considered trial is the function-selection-driven operation strategy (NO in S1404), the target function inference unit 308 saves the operation records. More specifically, the target function inference unit 308 temporarily holds the operation records of the currently-considered trial, for use in the calculation of a similarity with the target function candidates which have been narrowed down in S1405 (S1406).

The target function inference unit 308 determines whether or not the trials included in the operation records include a trial for which the processing S1403 to S1406 are not yet performed (S1407). If the trials include a trial for which the processing S1403 to S1406 are not yet performed (NO in S1407), the processing returns to S1403 and the processing S1403 to S1406 are performed for an unprocessed trial.

If the processing S1403 to S1406 have been performed for all the trials included in the operation records (YES in S1407), the target function inference unit 308 ranks the functions. That is to say, the target function inference unit 308 calculates a similarity between each of the functions narrowed down in the narrowing-down processing (S1405) and the function-selection-driven operation records temporarily held in S1406. The target function inference unit 308 ranks each function according to the degree of similarity (S1408). The similarity is calculated using the same method as in S1302 in FIG. 13.

Figure 15:
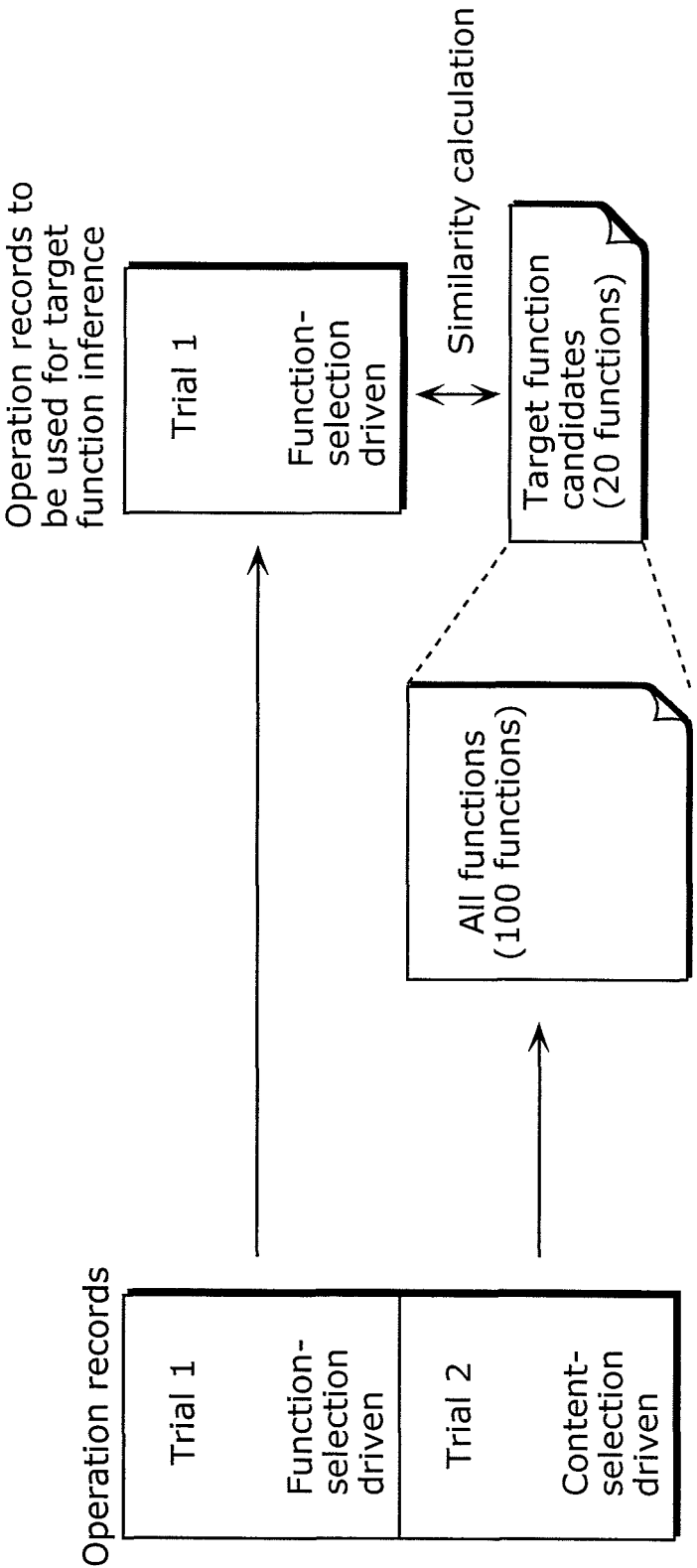
FIG. 15 is a diagram for describing processing of a target function inference unit according to an embodiment of the present invention.

The processing shown in the flowchart of FIG. 14 is described in more detail with reference to an explanatory diagram shown in FIG. 15. As shown in FIG. 15, it is assumed that the operation records to be used for the target function inference are of two trials (trials 1 and 2). It is also assumed that the former trial (trial 1) includes function-selection-driven operation records as shown in FIG. 1 and the latter trial (trial 2) includes content-selection-driven operation records as shown in FIG. 2. It is determined in S1404 in FIG. 14 that the former trial (trial 1) does not include content-selection-driven operation records and is thus saved in S1406 as operation records to be used for the target function inference. On the other hand, it is determined in S1404 in FIG. 14 that the latter trial (trial 2) includes content-selection-driven operation records, and thus the functions are narrowed down based on the type of content in S1405. For example, when there are 100 target function candidates and 20 of them are functions associated with the type of content determined using the latter trial, the target function candidates are narrowed down to the 20 functions in S1405. In S1408 in FIG. 14, a similarity is calculated between the operation records of the former trial (trial 1) saved for use in the target function inference and each of the 20 functions narrowed down based on the target content of the latter trial (trial 2). Further, each function is ranked, and the ranking is used as the result of the target function inference.

Again, with reference to FIG. 5, the following describes the remaining processing performed by the operation support apparatus 300.

The operation support determination unit 310 determines, for each of the functions ranked by the target function inference unit 308, an operation support method which enables execution of the corresponding function, and outputs the determined operation support method to the output unit 311 (S509). The output unit 311 displays the determined operation support method. The output unit 311 may be a display terminal such as a television set which displays an operation screen of the recording appliance, or a display terminal, such as a mobile phone, different from the display terminal which displays an operation screen of the recording appliance.

Figure 16:
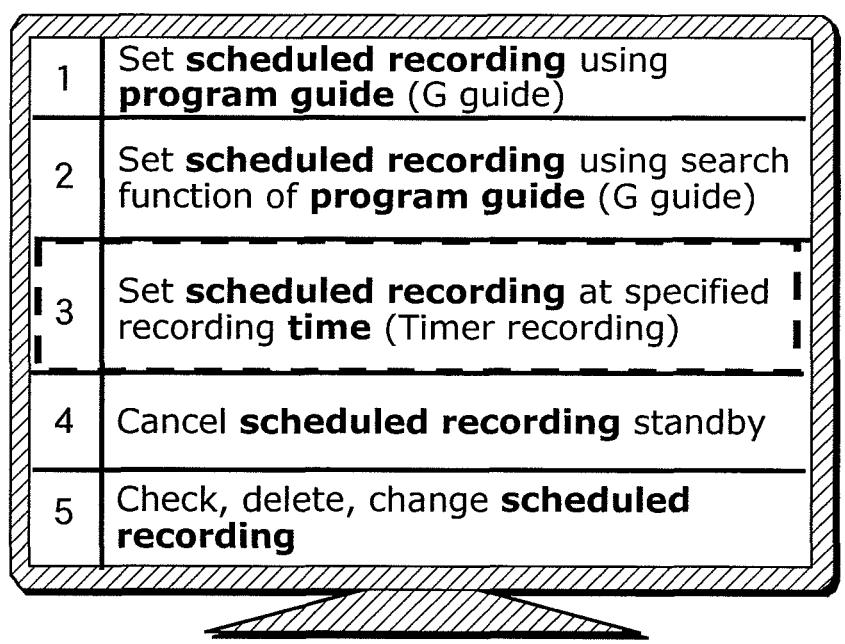
FIG. 16 shows an example of an operation support screen according to an embodiment of the present invention.
Figure 17:
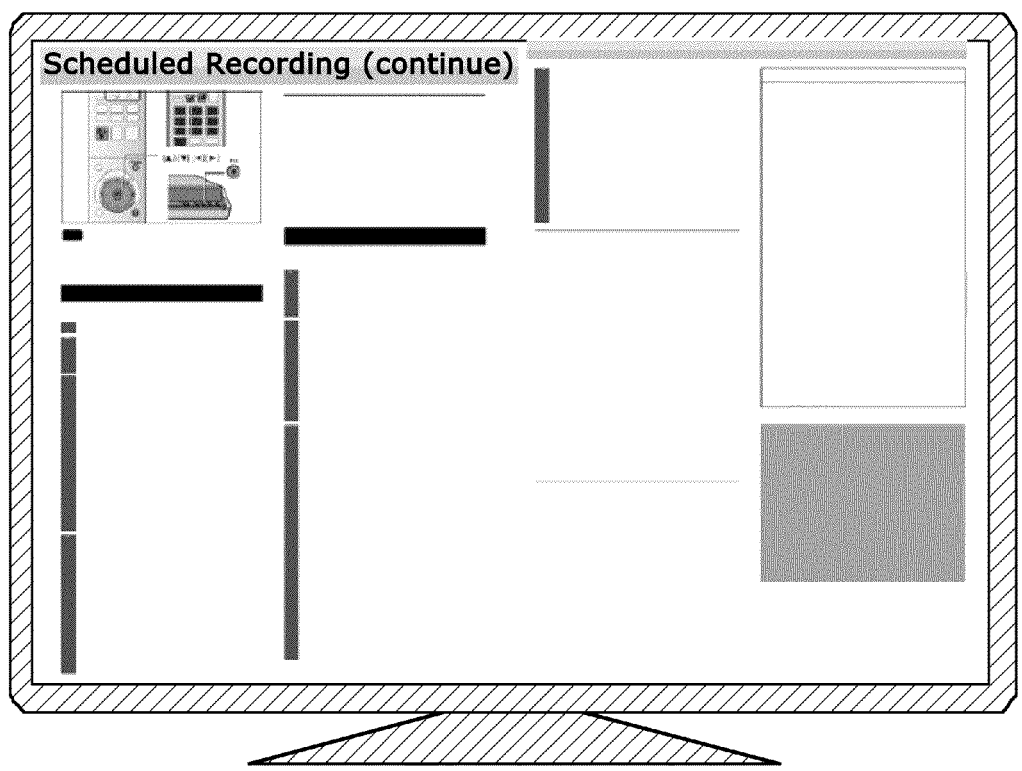
FIG. 17 shows an example of an operation support screen according to an embodiment of the present invention.

FIGS. 16 and 17 each show an example of the operation support screen. As shown in FIG. 16, the operation support determination unit 310 first arranges, in descending order of the inference scores, the functions obtained as a result of the target function inference, so as to display, on the output unit 311, the function descriptions 1202 included in the target function candidate information of FIG. 12. It is to be noted that in FIG. 16, the words highly related to the user's input records are shown with emphasis, so that the user can easily understand with what kind of standard the operation support apparatus 300 has obtained the inference result.

Next, when the user selects an item which the user thinks is his/her target function, the operation support determination unit 310 displays, on the output unit 311, a manual related to the selected function as shown in FIG. 17. It is to be noted that the displayed information regarding the selected function is not limited to a related page in the manual, and may be a screen or video pre-created for the operation support purposes. Further, the screen may move to a screen of the recording appliance which allows execution of the selected function.

Figure 18:
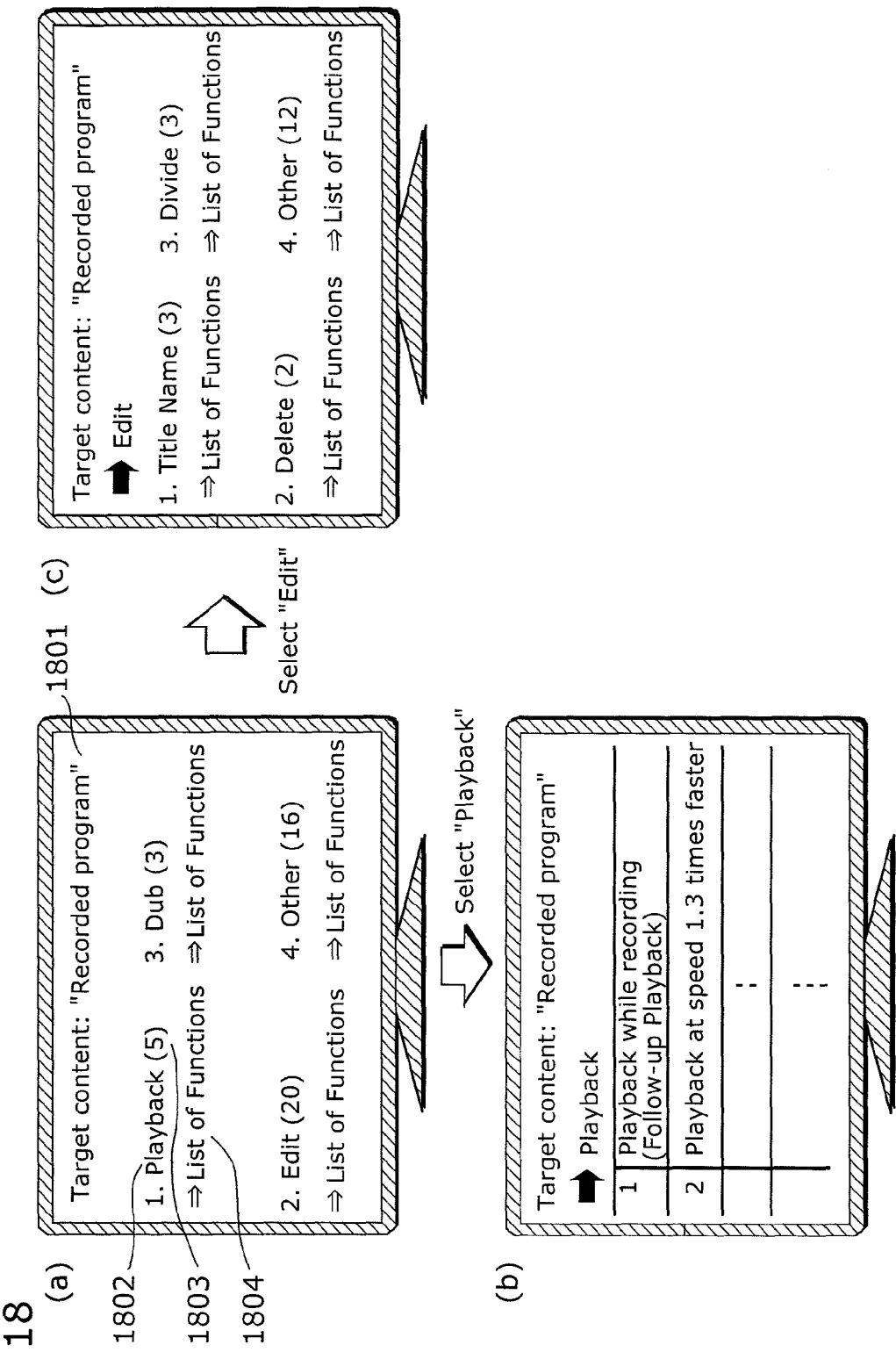
FIG. 18 shows examples of an operation support screen according to an embodiment of the present invention.

Furthermore, the operation support method may be changed according to the operation strategy. For example, in the case of the operation records which are based only on the content-selection-driven operation strategy, a word identifying a function is often not included in the operation records as described above. For this reason, words which feature functions (hereinafter referred to as "feature words") may be extracted from words explaining the functions that have been narrowed down based on the type of content, so as to group functions having a common feature word and display the grouped functions in a menu style. By doing so, the operation support apparatus 300 provides operation support of narrowing down the functions through interactions with the user. FIG. 18 shows an example of the operation support screen. As shown in the part (a) of FIG. 18, the operation support screen displays "recorded program" as an example of a type of inferred content 1801. Further, "playback" is displayed as an example of feature words 1802. For example, feature words 1802 are obtained by extracting, from functions which can be executed on the content of "recorded program", a predetermined number of words, starting from a word having a highest appearance frequency. The operation support screen displays each feature word 1802 and the number of functions including the feature word 1802 (hereinafter referred to as "number of associated functions") 1803. For example, the number of associated functions 1803 of the feature word 1802 "playback" is "5". Further, when a list of functions including the feature word 1802 is displayed, the operation support screen displays items 1804 from which the user makes a selection.

The action performed when a feature word 1802 is selected differs depending on whether or not the number of associated functions 1803 is equal to or smaller than a predetermined threshold. For example, the following describes a case where the threshold is 5. In the case of selecting the feature word 1802 "playback" on the operation support screen shown in the part (a) of FIG. 18, the number of associated functions 1803 "5" is equal to or smaller than the threshold "5". Therefore, the operation support screen showing a list of associated functions is displayed as shown in the part (b) of FIG. 18. On the other hand, in the case of selecting, on the operation support screen shown in the part (a) of FIG. 18, the feature word "edit" that has "20" associated functions, the number of associated functions is greater than the threshold "5". Therefore, the operation support screen for further narrowing down the functions using another feature word is displayed as shown in the part (c) of FIG. 18. On this operation support screen, the type of content is "recorded program", and extracted and displayed as feature words are words which are other than the feature word "edit" and which frequently appear in the 20 functions including the feature word "edit". For example, "title name" is displayed as a feature word.

It is to be noted that when the user wants to see a list of associated functions on the operation support screen shown in the part (a) or (c) of FIG. 18 regardless of the number of associated functions 1803, the user selects an item 1804 associated with a desired feature word. By doing so, the operation support screen showing a list of associated functions as shown in the part (b) of FIG. 18 is displayed, allowing the user to see the list of associated functions.

Further, as for the functions which can be executed on content, even the same function is sometimes achieved through different operation methods; namely a content-selection-driven operation method and a function-selection-driven operation method. When providing operation support, in order to allow the user to naturally learn the operation procedure, it is considered favorable to present the procedure using a method which is suited to the operation strategy that the user has originally had for the target function.

In view of the above, as a method for providing operation support suited to the user's operation strategy, the operation support determination unit 310 may change a function achieving method to be presented, depending on the operation strategy determined by the operation strategy determination unit 305.

Figure 19:
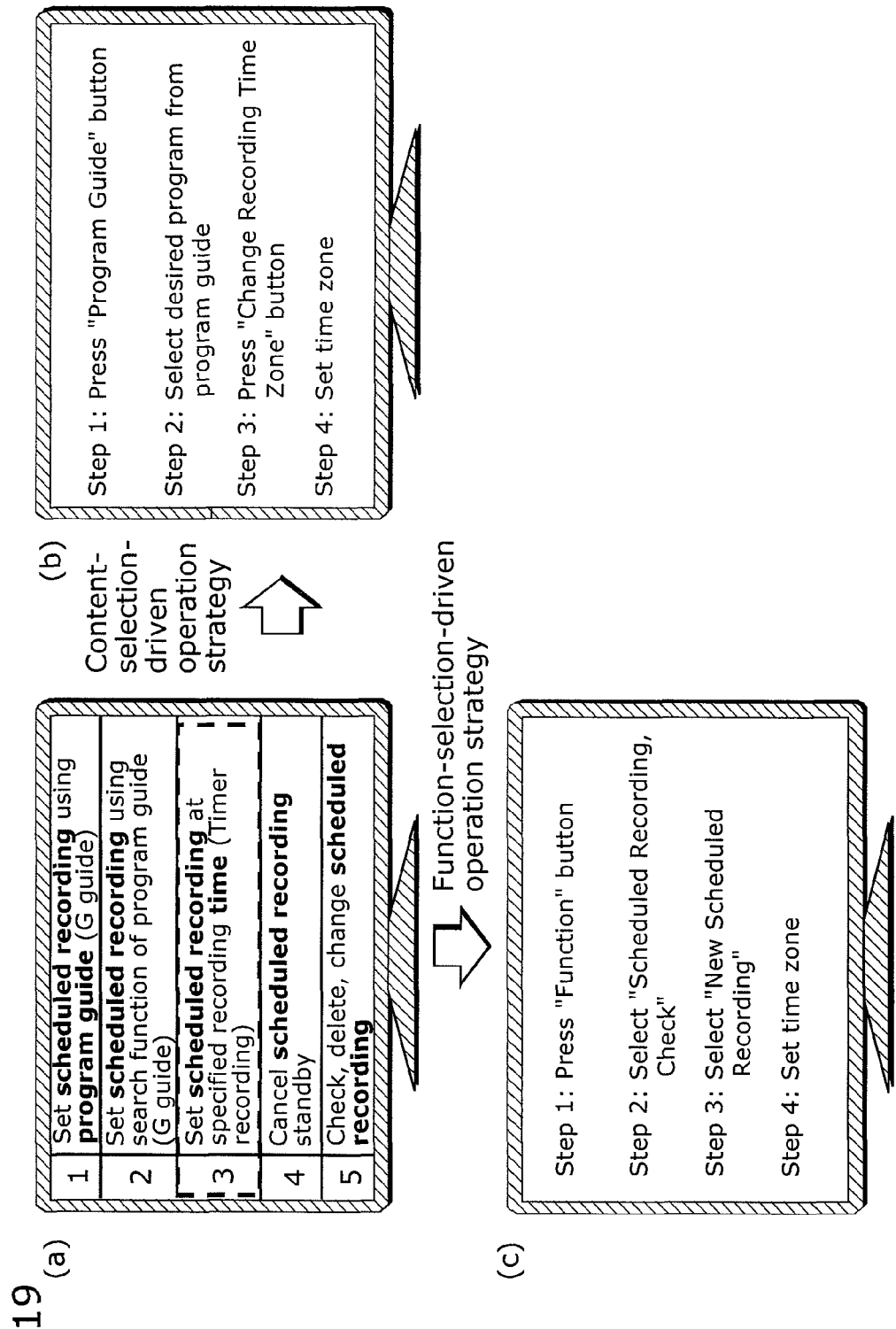
FIG. 19 shows examples of an operation support screen according to an embodiment of the present invention.

More specifically, the operation support determination unit 310 identifies the user's operation strategy when the user selects a target function on the screen showing the result of the target function inference as shown in the part (a) of FIG. 19. In the case of identifying that the user's operation strategy is the content-selection-driven operation strategy, the operation support determination unit 310 presents the content-selection-driven operation method by which the user selects content first and a function next as shown in the part (b) of FIG. 19. On the other hand, in the case of identifying that the user's operation strategy is the function-selection-driven operation strategy, the operation support determination unit 310 presents a method by which the user selects a function from among menu selections as shown in the part (c) of FIG. 19.

Further, when the user has multiple operation strategies, an operation support method may be determined with a priority given to the operation strategy that the user has initially tried.

Figure 20:
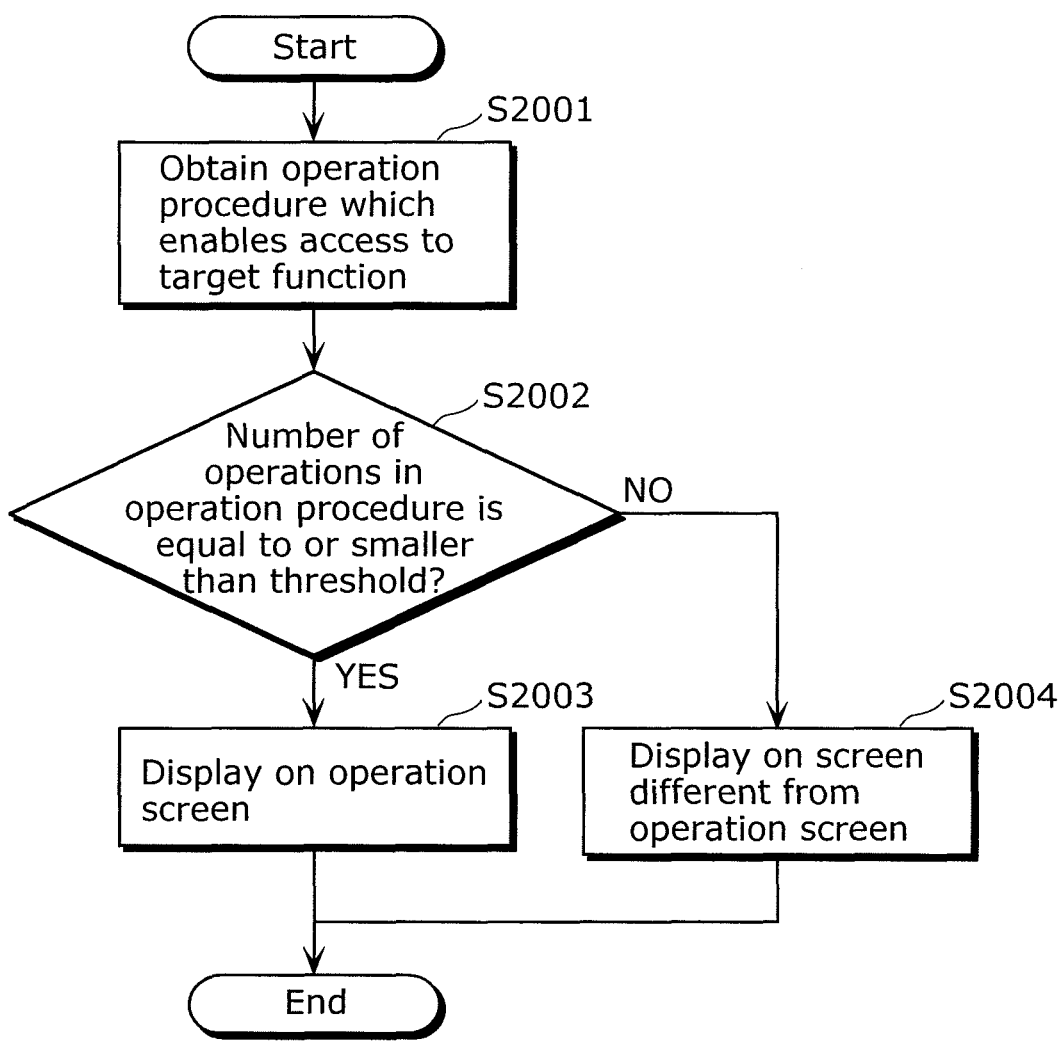
FIG. 20 is a flowchart showing processing of an operation support determination unit according to an embodiment of the present invention.

Furthermore, in the case of providing the operation support by presenting an operation procedure on the same screen as the operation screen, the operation support screen and the operation screen cannot be displayed at the same time. For this reason, the user needs to memorize the operation procedure displayed on the operation support screen, and then go back to the operation screen to perform the procedure. In this case, if there are many operation steps, the user needs to memorize many things, which is more burdensome for the user. Thus, the operation support screen may be changed according to the number of operation steps. For example, a support function, which is a function for which support is to be provided, is determined through the user's selection of a target function on the screen showing the result of the target function inference as shown in the part (a) of FIG. 19. Here, the operation support determination unit 310 changes the support screen according to the number of operation steps necessary for accessing the function. FIG. 20 shows a flowchart showing a processing procedure for changing the support screen according to a support function.

The operation support determination unit 310 obtains an operation procedure which enables an access to the target function (S2001). The operation support determination unit 310 calculates the number of necessary operations in the obtained operation procedure, and compares the calculated number with a threshold (S2002). If the number of operations is equal to or smaller than the threshold (YES in S2002), the operation support screen is displayed on the same screen as the operation screen when the operation screen is not displayed (S2003).

On the other hand, if the number of necessary operations in the operation procedure is greater than the threshold (NO in S2002), the operation support determination unit 310 displays the operation support screen on a screen different from the operation screen (S2004). The different screen is a screen of a mobile phone, for example, and may be any screen as long as it allows the user to perform the actual operations while looking at the operation support screen.

In such a manner, when there is a large number of operations, the operation support is displayed on a screen different from the screen of the recording appliance on which the actual operations are to be performed, thereby eliminating the need for the user to memorize the entire operation procedure. As a result, the operation support can be provided in a manner that is less burdensome for the user.

In the processing of the flowchart shown in FIG. 20, the display screen is determined based on the number of operations necessary for accessing the target function. The display screen may also be determined using information indicating the user's operation strategy and the operations that the use has already performed, which can be obtained from the operation records. This is based on the following two ideas: The first idea is that the presentation of the operation procedure suited to the user's operation strategy is effective. The second idea is that in the case where the user is close to accessing the target function, the user can memorize operations necessary for accessing the target function even when the number of such operations is large.

Figure 21:
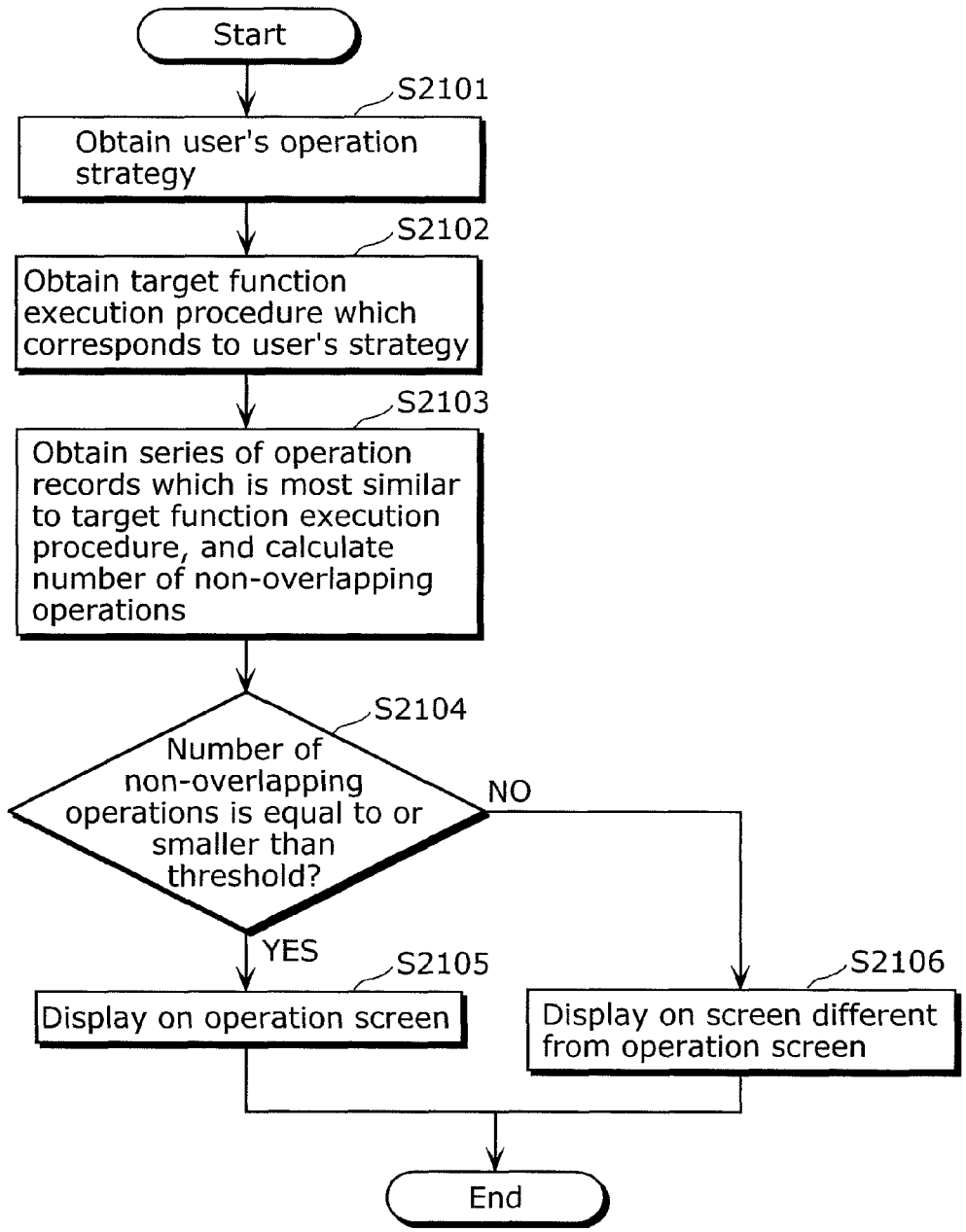
FIG. 21 is a flowchart showing processing of an operation support determination unit according to an embodiment of the present invention.

FIG. 21 is a flowchart showing a processing procedure for determining, using the operation records, a screen which displays the operation support.

The operation support determination unit 310 obtains the user's operation strategy determined by the operation strategy determination unit 305 (S2101). The operation support determination unit 310 obtains, from the target function candidate information stored in the target function candidate storage unit 309 (function execution procedure 1205 in FIG. 12), an execution procedure of the function for which the user has made an operation support request (S2102). In doing so, when there is an execution procedure corresponding to the operation strategy obtained in S2101, the operation support determination unit 310 obtains the corresponding execution procedure.

The operation support determination unit 310 compares the execution procedure of the target function obtained in S2102 and the user's operation records, and obtains, from among the user's operations, a series of operations which is most similar to the target function execution procedure. Further, the operation support determination unit 310 calculates the number of non-overlapping operations which is the number of operations in the target function execution procedure which do not overlap with the series of operations obtained. To find the series of operations which is most similar to the target function execution procedure, the operation support determination unit 310 calculates the number of operations that consecutively match the operations of the target function execution procedure, starting from the operation at the beginning of the target function execution procedure. The operation support determination unit 310 determines, as the series of operations most similar to the target function execution procedure, a series of operations which includes the greatest number of matching operations. Thus, a series of operations which partially matches the operations of the target function execution procedure is not obtained.

The operation support determination unit 310 compares the number of non-overlapping operations obtained in S2103 and a threshold (S2104). If the number of non-overlapping operations is greater than the threshold (NO in S2104), the target function execution procedure includes many operations that the user has not experienced. Accordingly, it is burdensome for the user to memorize the procedure. Thus, the operation support determination unit 310 displays the operation support screen on a screen different from the operation screen (S2106).

Figure 22:
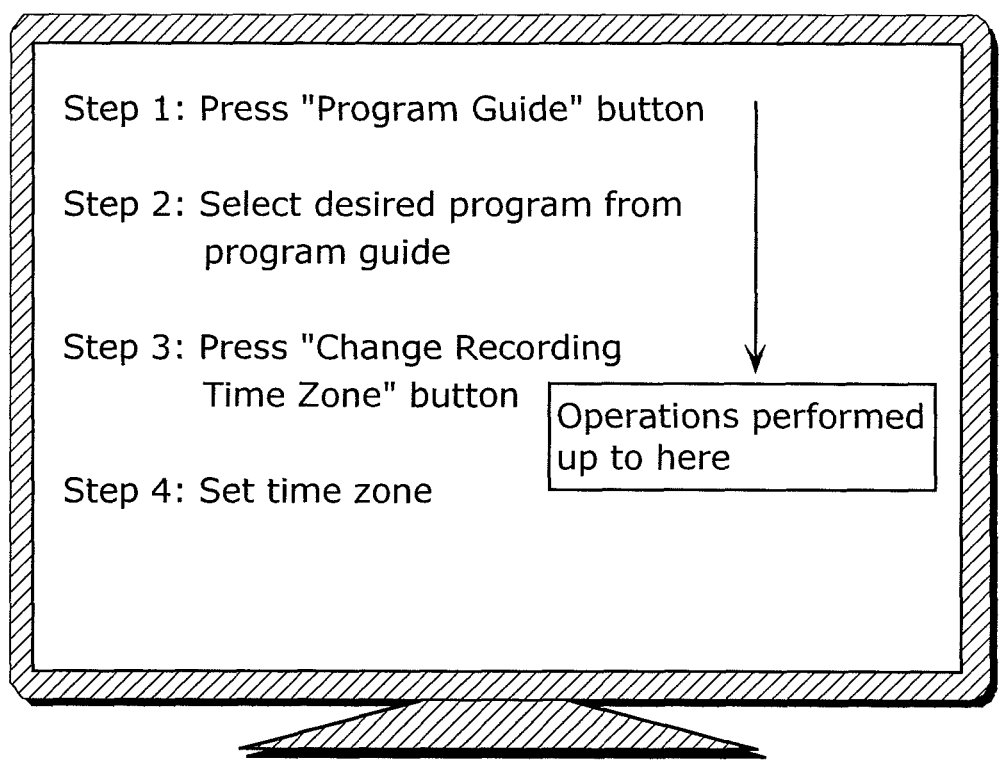
FIG. 22 shows an example of an operation support screen according to an embodiment of the present invention.

On the other hand, if the number of non-overlapping operations is equal to or smaller than the threshold (YES in S2104), the target function execution procedure includes operations that the user has experienced before. Accordingly, even when there is a large number of operations, the user only needs to memorize the difference between all the operations and the experienced operations, and thus it is less burdensome for the user to memorize the procedure. Thus, the operation support determination unit 310 displays the operation support screen on the same screen as the operation screen when the operation screen is not displayed (S2105). FIG. 22 shows an example of the operation support screen displayed on the same screen as the operation screen. It is assumed that among four operations necessary for achieving the target function, the user has already performed three operations in previous operations. Therefore, in the example shown in FIG. 22, the operation support is provided on the same screen as the operation screen, while at the same time information indicating which operations have already been performed by the user is also provided.

As described so far, the operation support apparatus according to an embodiment of the present invention changes, based on the user's operation strategy, the method of inferring the target function. More specifically, the operation support apparatus determines, based on the user's operation records, whether or not the user's operation strategy is the content-selection-driven operation strategy. In the case of determining that it is the content-selection-driven operation strategy, the operation support apparatus infers the target content so as to narrow down the target function candidates. This increases the accuracy of the target function inference and enables provision of operation support suited to the user.

(Variation 1)

Although the content inference unit 306 in the above embodiment infers the type of the content using the screen information, the type of the content may be inferred by further using selection information. To be more specific, when the user performs a predetermined operation with particular content selected, the content inference unit 306 infers, so as to limit the functions, the type of content which is more specific than the type of content that can be obtained only by using the screen information described in the above embodiment. For example, the content inference unit 306 infers the type of content specifically to the extent that the "recorded content" is specified as "Broadcasting Satellite (BS) Digital" or "Terrestrial Digital". After that, the target function inference unit 308 may narrow down the functions based on the inferred type of content.

In such a manner, through the inference of the specific type of content by the content inference unit 306, the target function inference unit 308 can narrow down the target function candidates. As a result, the target function inference unit 308 improves the accuracy of the target function inference and enables provision of operation support suited to the user.

(Variation 2)

In the above embodiment, as for the user having the content-selection-driven operation strategy, the target function candidates are narrowed down based on the type of content inferred using the screen information. However, even with the same type of content, executable functions sometimes differ depending on the content. In the present variation, functions are ranked based on functional specialty with respect to content, assuming that the reason why the user cannot execute the target function is possibly because the user's target function is a rarely executed function unique to the content (special function). More specifically, the operation support apparatus 300 further includes a target content specialty determination unit in addition to the constituent elements of the operation support apparatus 300 of the above embodiment. The target content specialty determination unit determines, when the user has performed an operation with particular content as a base point, whether or not functions executable on the particular content are special as compared to functions executable on other content. Further, the target content specialty determination unit changes the target function inference processing using the determination result.

Moreover, the reason why the user cannot execute the target function may be because the user is trying to execute a function (unused function) other than frequently-used functions.

Figure 23:
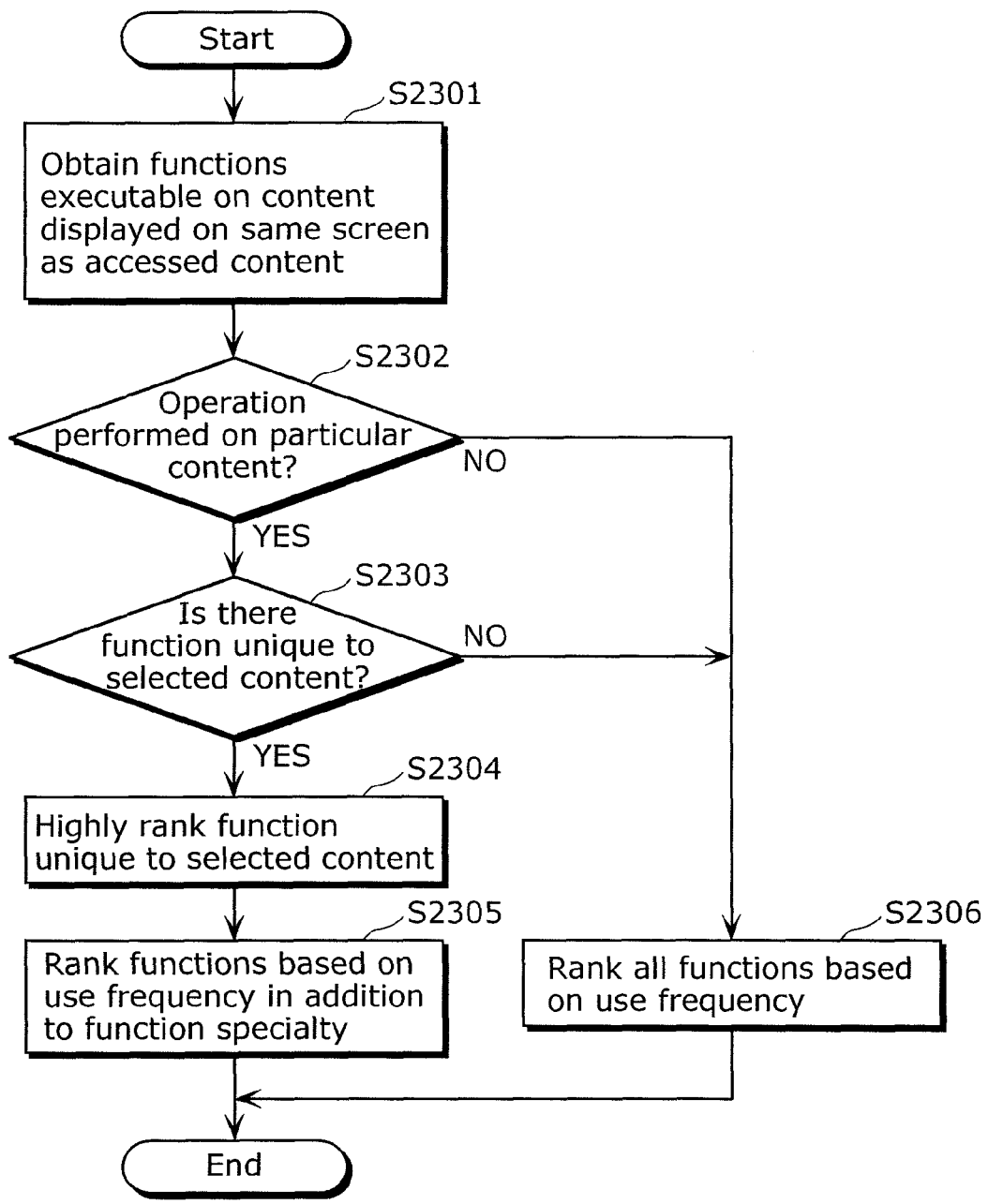
FIG. 23 is a flowchart showing processing of a target content specialty determination unit according to Variation 2 of an embodiment of the present invention.
Figure 24:
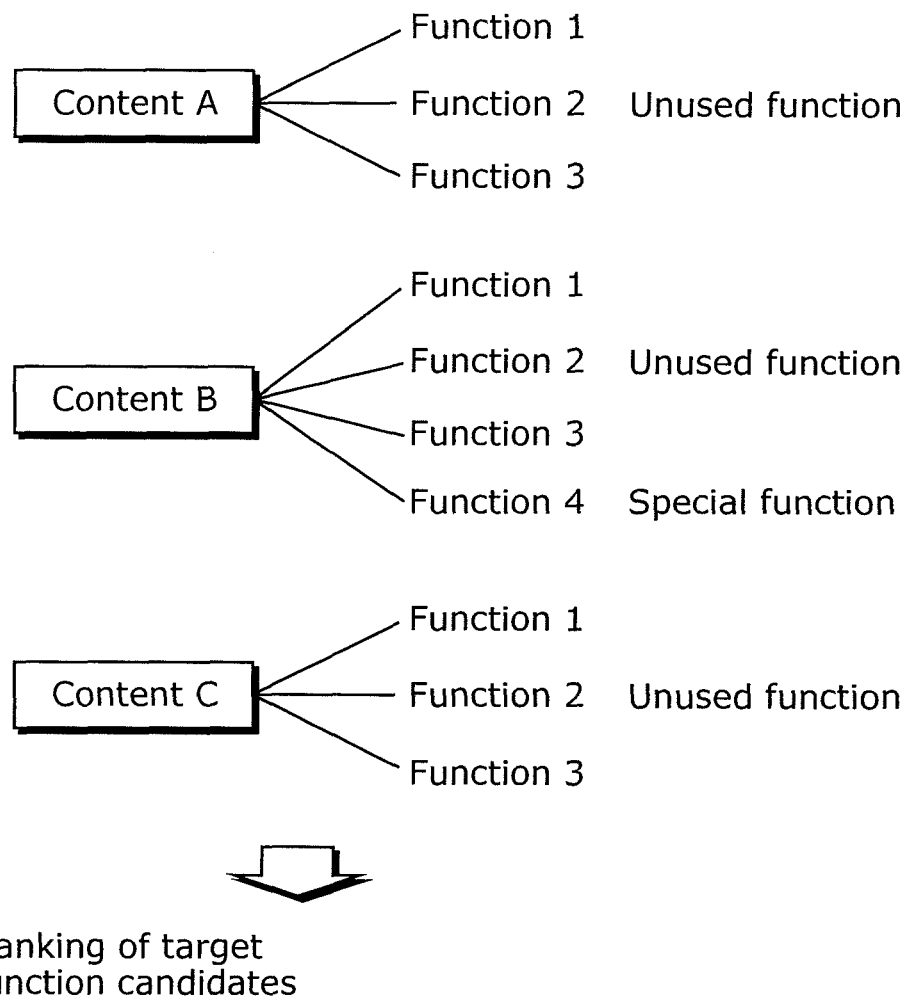
FIG. 24 is a diagram for describing processing performed by a target-content specialty determination unit according to Variation 2 of an embodiment of the present invention.

Thus, in the present variation, based on the above two ideas, target function candidates are ranked for the content-selection-driven user through processing of a flowchart shown in FIG. 23. It is to be noted that here, as shown in FIG. 24, content A, B, and C are assumed as the types of content. Each content is provided with three functions; functions 1 to 3. It is assumed that the content B has, aside from the three functions, a function 4 as a function unique to the content B (special function). Further, the function 2 is assumed as an unused function.

The target content specialty determination unit obtains, from the operation records stored in the operation record storage unit 303, all the content displayed on the same screen as the particular content. Further, the target content specialty determination unit obtains executable functions of each content from the target function candidate information stored in the target function candidate storage unit 309 (S2301). The example shown in FIG. 24 assumes that the content A, B, and C are obtained. It is also assumed that three functions, i.e., the function 1 to 3, are obtained as the functions of the content A and C, and four functions, i.e., the function 1 to 4, are obtained as the functions of the content B.

The target content specialty determination unit determines, based on the operation records stored in the operation record storage unit 303, whether or not the user has performed an operation on particular content (S2302). More specifically, the target content specialty determination unit determines whether or not the user has selected content and performed a button operation, such as pressing "Sub menu" or "Enter" described above.

If it is determined that the user has performed an operation on particular content (YES in S2302), the target content specialty determination unit determines whether or not there is a function unique to the particular content (hereinafter referred to as "selected content") (S2303). In other words, the target content specialty determination unit examines whether or not each function associated with the selected content is executable also on the other content. The target content specialty determination unit determines that there is a unique function in the case where the percentage of the other content on which the function is executable among all of the other content is equal to or smaller than a predetermined threshold. For example, it is assumed that the threshold is 50% and that the function 1 is a function associated with the selected content and is executable on 80% of the other content. In this case, it is determined that the function 1 is not a function unique to the selected content. On the other hand, it is assumed that the function 4 is a function associated with the selected content and is executable on 10% of the other content. In this case, it is determined that the function 4 is a function unique to the selected content. In such a manner, among functions associated with the selected content, a function whose percentage of being a function associated with the other content is equal to or smaller than the predetermined threshold is determined as a unique function. In the case where the selected content is the content B in the example shown in FIG. 24, each of the functions 1 to 3 is executable on 100% of the other content (content A and C) and is thus not a unique function. On the other hand, the function 4 cannot be executed on the other content (content A and C) and is thus a unique function.

The target content specialty determination unit performs the ranking such that the function which is associated with the selected content and has been determined as a unique function in S2303 is ranked more highly than the other functions as an inferred target function (S2304). For example, when the selected content is a "recorded program" which can be copied only once, the function of "deleting the recorded program" is executable also on the other "recorded programs". However, the function of "dubbing a copy-once program onto a DVD" is a function unique to the selected content. Thus, the function of "dubbing a copy-once program onto a DVD" is ranked more highly than the function of "deleting the recorded program". The ranking may be changed depending on the percentage of the function which can be executed on the other content. Furthermore, the functions may be classified into two groups based on the determination as to whether they are unique functions or non-unique functions, so as to rank the unique functions more highly than the non-unique functions, and then, further ranking may be performed using another method.

If no operation has been performed on particular content (NO in S2302) or there is no function unique to the selected content (NO in S2303), the ranking may be performed based on a use frequency of each function. More specifically, the target content specialty determination unit calculates a use frequency of each of the target function candidates, using the operation records stored in the operation record storage unit 303. The target content specialty determination unit performs the ranking such that a function having a low use frequency is highly ranked (S2306). This is because the user is less likely to make an operation support request for frequently-used functions.

On the other hand, in, the case of ranking the functions using the function specialty in S2304, the target content specialty determination unit ranks functions which need further ranking, using the use frequency (S2305). For example, in S2304, in the case of merely classifying the functions into two groups of unique functions and non-unique functions, the ranking is performed for each function group such that a function having a low use frequency is highly ranked. In the example shown in FIG. 24, the special function (function 4) is classified into a function group different from the function group of the other functions (functions 1 to 3), and the special function (function 4) is highly ranked. Further, a function among the functions 1 to 3 which has a low use frequency is highly ranked. As a result, the function 4, the function 2, the function 1, and the function 3 are ranked in this order.

It is to be noted that in the above description, the other content displayed on the same screen as the content selected by the user is used as the content to be used in the determination as to whether or not the selected content has a special function. Instead, content on which a function has been executed within a certain time period in the past may be used. More specifically, content on which a function has been executed within a certain time period in the past may be extracted from the operation records, and the determination as to whether or not the content selected by the user has a special function may be performed in the above-described manner using the extracted content as the other content.

(Variation 3)

In the above embodiment, a selected item is extracted from the operation records, and a similarity between the operation records and each of the target function candidates is calculated using the selected item so as to rank the target function candidates. In contrast, the present variation aims to further improve the accuracy of the target function inference, using a word included in unselected items.

Figure 25:
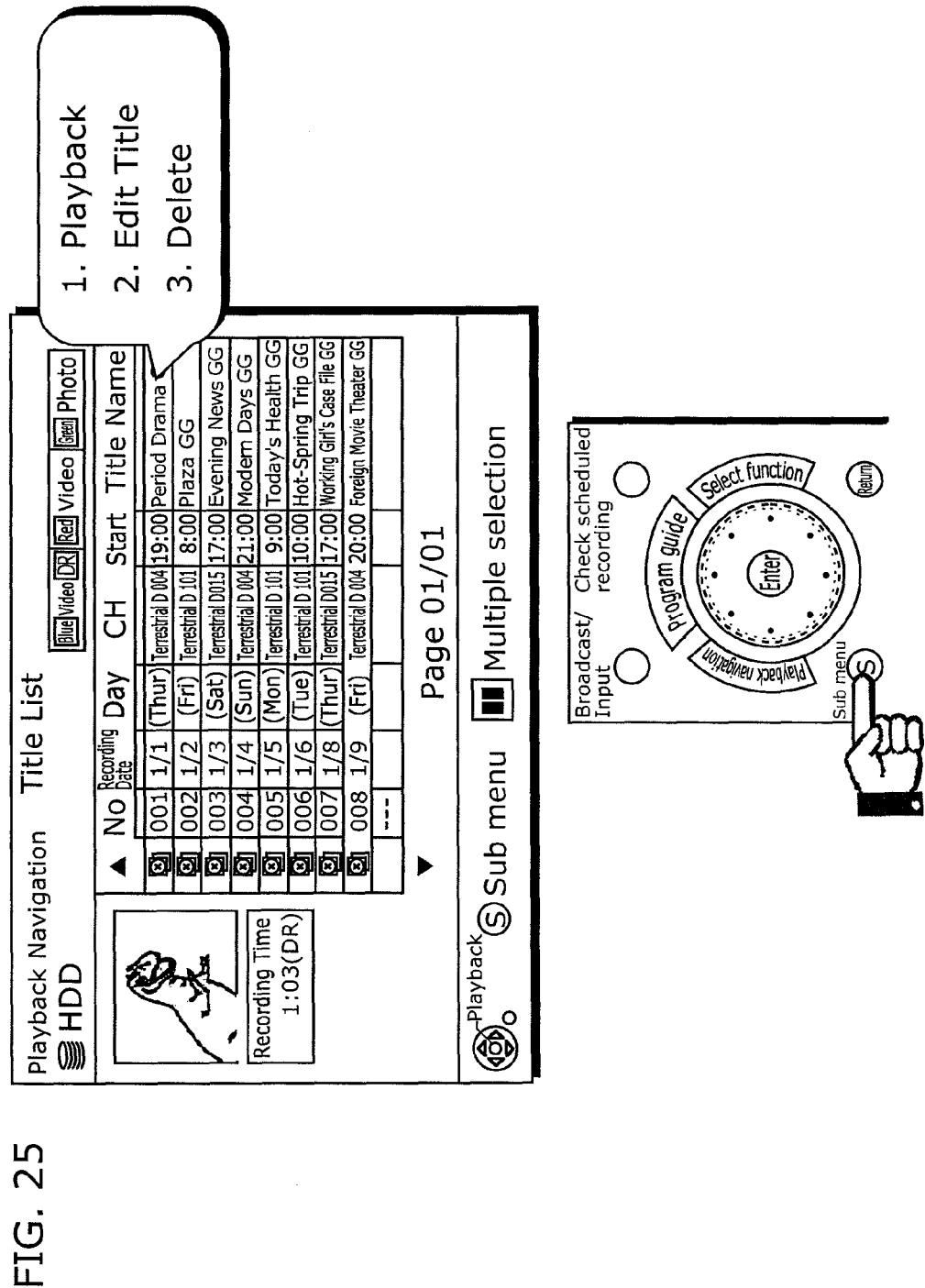
FIG. 25 shows an example screen of a recording appliance according to Variation 3 of an embodiment of the present invention.

The following describes unselected items with reference to FIG. 25 and the selection records shown in FIG. 2. In the operation number 2 in the selection records shown in FIG. 2, the "Sub menu" button is selected on the "Playback Navigation" screen. An example of the screen at this time is shown in FIG. 25. The "Playback Navigation" screen displays a list of recorded programs. When the user moves the cursor to a particular recorded program on the list and selects the "Sub menu" button on the remote control, a screen like a pop-up window is displayed as shown in FIG. 25. The pop-up window displays items for accessing functions which can be executed on the selected recorded program. For example, selecting the item "3. Delete" in the pop-up window shown in FIG. 25 leads to execution of the function of deleting the selected recorded program.

The selection records shown in FIG. 2 indicate that none of the menu items displayed as the sub menu was selected even through the "Sub menu" button was pressed. From this, it is possible to observe that none of these functions is the user's target function.

In view of the above, information about unselected items 2604 as shown in FIG. 26 is stored in the operation record storage unit 303. Further, at the time of narrowing down the functions in S1303 in FIG. 13, the target function inference unit 308 further performs the narrowing-down processing by excluding, from the target function candidates, functions including words in the unselected items 2604.

It is to be noted that at the time of narrowing down the target function candidates using the unselected items 2604, information may be used which indicates in which description of the target function candidate information the words in the unselected items 2604 are included. For example, the narrowing-down processing may be performed by using only the information that indicates whether or not the words in the unselected items 2604 are included in the function description 1202 of the target function candidate information shown in FIG. 12.

In such a manner, the target function candidates are narrowed down using the unselected items 2604. This allows narrowing down the target function candidates to an extent that the resulting number of narrowed-down functions is smaller than the number of functions resulting from the narrowing-down processing performed based on the type of content obtained from the screen information. This enables more accurate inference of the target function, allowing provision of operation support suited to the user.

(Variation 4)

In the above embodiment, when the user's operation strategy is the function-selection-driven operation strategy, the target function inference unit 308 ranks target function candidates based on a similarity between a set of words included in the user's selection records and a set of words used for explaining each function. The present variation describes a change in the ranking of the target function candidates when the user's operation strategy is determined as the function-selection-driven operation strategy.

Figure 27:
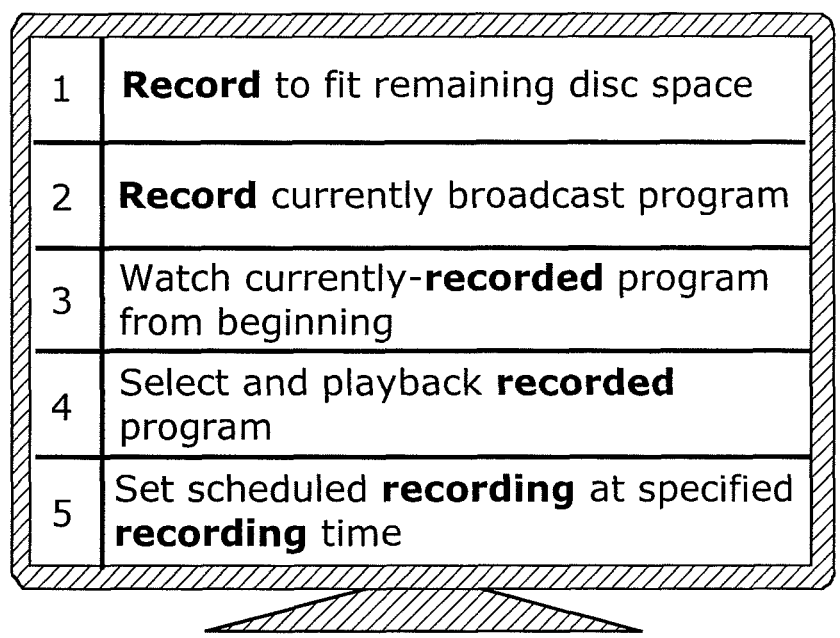
FIG. 27 shows an example of an operation support screen according to Variation 4 of an embodiment of the present invention.

For example, the word "record" frequently appears in the selection records shown in FIG. 1 which are determined as the function-selection-driven selection records. Thus, the target function inference unit 308 highly ranks the functions including the word "record". FIG. 27 shows an example of the operation support screen for this case. This operation support screen displays the functions obtained as a result of the target function inference in descending order of the inference scores. Each function includes the word "record". However, the word "record" is used for two purposes; one is to describe the action of the function, and the other is to describe the type of content. An example of the former is a case where the word "record" is used to describe the action of the function "record", as in the functions ranked first, second and fifth on the operation support screen of FIG. 27. An example of the latter is a case where the word "record" is used to describe the type of content such as "currently-recorded program" and "recorded program", as in the functions ranked third and fourth on the operation support screen of FIG. 27. Thus, when the user's operation strategy is the function-selection-driven operation strategy, the target function inference unit 308 infers the target function by making use of the fact that a word included in the user's operation records is highly likely to have been selected by the user as a word describing an action of a function. More specifically, the target function inference unit 308 changes the ranking of the target function candidates, so as to highly rank a function whose action is described using the word included in the user's operation records. For instance, in the above-described example, the target function inference unit 308 changes the inference ranking so as to highly rank the functions whose actions are described using the word "record".

Figure 28:
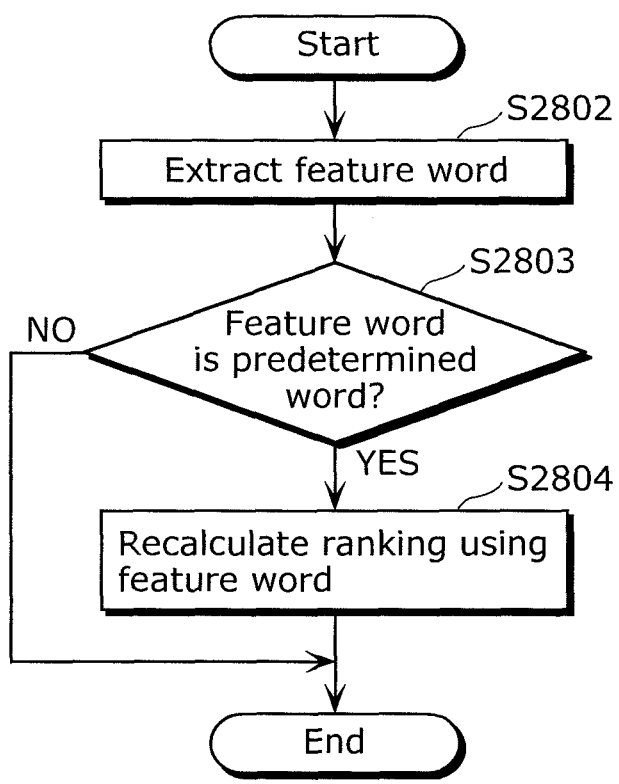
FIG. 28 is a flowchart showing processing of a target function inference unit according to Variation 4 of an embodiment of the present invention.

FIG. 28 is a flowchart of the processing performed by the target function inference unit 308 for changing the ranking of the target function candidates. This processing is performed in the case where the operation strategy determination unit 305 determines that the user's operation strategy is the function-selection-driven operation strategy. That is to say, it is processing performed immediately after the similarity calculation (S1302) in the flowchart of FIG. 13.

The target function inference unit 308 extracts a feature word from the user's selection records used for the target function inference in S1302 (S2802). This feature word is determined using the appearance frequencies of words included in the user's selection records or in the function descriptions of the target function candidates. For example, the target function inference unit 308 determines, as the feature word, a word having a high appearance frequency among words included in the user's selection records or in the function descriptions of the target function candidates.

The target function inference unit 308 determines whether or not the feature word extracted in S2802 is a predetermined word (S2803). The predetermined word used for the above determination is a word which describes an action of a function, and the examples include "record" and "playback". This predetermined word may be registered by the system developers in advance, or determined using word class information resulting from a morphological analysis. Further, in the case where functions are categorized according to their actions in the manual or the like, the predetermined word may be a word included in the category classification. If the extracted word is not the predetermined word (NO in S2803), the target function inference unit 308 finishes the processing without changing the ranking of the target function candidates.

On the other hand, if the extracted word is the predetermined word (YES in S2803), the target function inference unit 308 re-ranks the functions ranked in S1302, using the feature word (S2804). More specifically, the target function inference unit 308 first extracts, from the target function candidates, functions including the feature word determined in S2803. Next, the target function inference unit 308 determines, for each of the descriptions of the extracted functions, whether or not the feature word is used for describing the action of the function. The target function inference unit 308 more highly ranks the function whose action is described using the feature word.

It is to be noted that if more than one feature word is extracted in S2802 and S2803, the target function inference unit 308 performs the same processing on functions which include a common feature word.

Figure 29A:
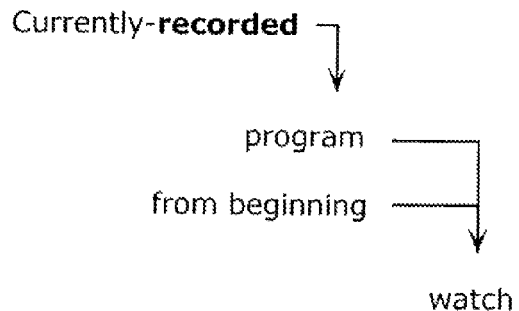
FIG. 29A shows an example of a parsing result according to Variation 4 of an embodiment of the present invention.
Figure 29B:
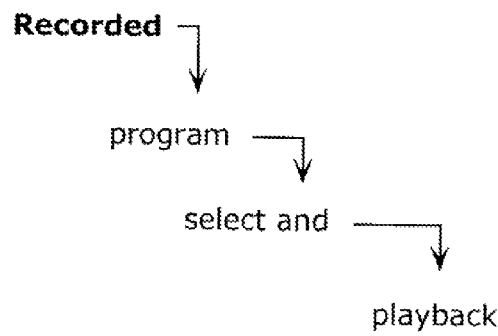
FIG. 29B shows an example of a parsing result according to Variation 4 of an embodiment of the present invention.
Figure 29C:
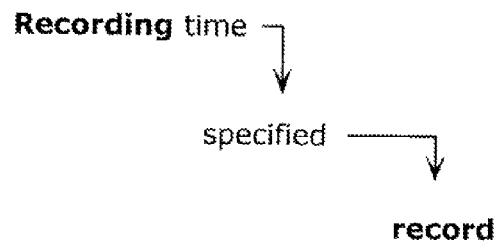
FIG. 29C shows an example of a parsing result according to Variation 4 of an embodiment of the present invention.

The following describes a specific example of the above processing. It is assumed as a result of the calculation of the inference ranking in S1302, the target function candidates were ranked as shown in FIG. 27. It is also assumed that the word "record" is extracted as the feature word as a result of the feature word extraction in S2802. In S2803, in the case of defining the predetermined word as a word whose word class in Japanese is noun which becomes verb when "suru" is added, the word "record" is determined as the predetermined word as a result of a morphological analysis. In S2804, parsing is performed on the titles of functions as an example of the descriptions of the target function candidates. FIGS. 29A to 29C each show an example of a result of modification calculation performed through parsing.

Figure 30:
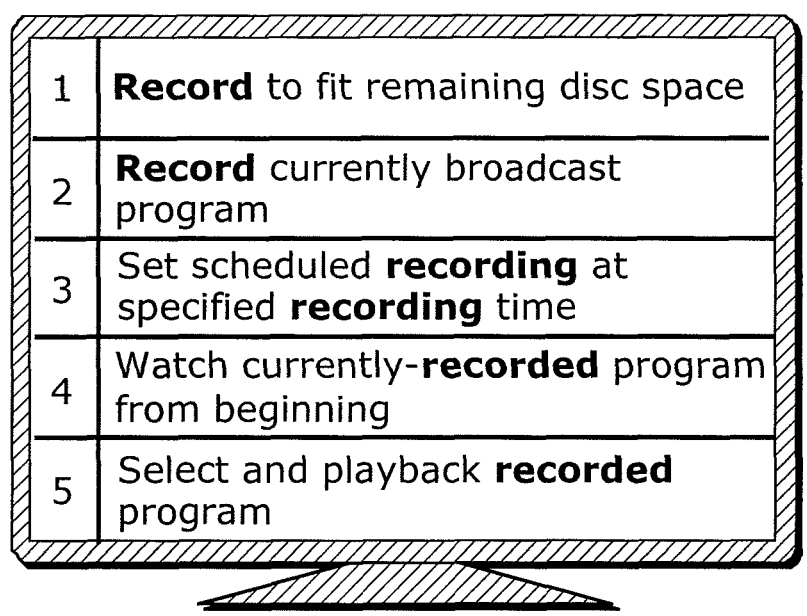
FIG. 30 shows an example of an operation support screen according to Variation 4 of an embodiment of the present invention.

Referring to FIGS. 29A and 29B, in the case of the titles of the functions ranked third and fourth in FIG. 27, a segment including the word "record" acts upon another segment as a modifier. Thus, it is determined that the word "record" is not used for describing the actions of these functions. On the other hand, referring to FIG. 29C, in the case of the title of the function ranked fifth in FIG. 27, although there is a segment which includes the word "record" as a modifier of another segment, the last segment including the word "record" does not act upon any other segments. Thus, it is determined that the word "record" is used for describing the action of this function. Likewise, parsing the titles of the functions ranked first and second in FIG. 27 shows that in the titles of both functions, the segment including the word "record" does not modify the other segments. Thus, it is determined that the word "record" is used for describing the actions of these functions. Through such processing, re-ranking is performed such that the fifth-ranked function is given a higher rank. The result of the re-ranking is shown in FIG. 30. The function ranked fifth in FIG. 29C is re-ranked third, and the functions ranked third and fourth are re-ranked fourth and fifth, respectively.

Further, in S2803, in the case of defining the predetermined word as a word included in the categories of functions classified according to their actions in the manual or the like, functions which are classified in a category classification which includes the predetermined word may be ranked highly in S2804.

In the above processing, the functions obtained as a result the target function inference are re-ranked using the feature word in the case where the extracted feature word is the predetermined word. However, the method of re-ranking the functions is not limited to this. For example, the feature word does not have to be extracted. In the case where the predetermined word is included in all the words which are included in the user's selection records and are used for the target function inference, the functions obtained as a result of the target function inference may be re-ranked using the predetermined word.

In such a manner, when the user's operation strategy is the function-selection-driven operation strategy, highly ranking the function whose action is described with the feature word included in the user's selection records allows the functions obtained as a result of the target function inference to be ranked in such a way that the intention of the user's selections is further reflected.

(Evaluation Experiment)

An evaluation experiment was conducted to verify the effectiveness of the operation support apparatus according to an aspect of the present invention. The following describes the result which confirmed its effectiveness.

(Selection Record Collection Experiment)

An experiment for collecting selection record data was conducted using, as the evaluation target appliance, a Panasonic DVD recorder "DIGA DMR-EX300" which is a recording appliance having a menu-selection-style interface. Prior to this collection experiment, 100 functions were extracted, centering on the functions shown in the table of contents in the operating instructions of the evaluation target appliance, for use as target function candidates.

In this experiment, eight tasks shown in Table 1 were given to six female subjects in their twenties to forties with no experience of using the target appliance. The "Task Instruction Statements" in Table 1 are instruction statements presented to the subjects for executing each task. The evaluation tasks were determined so as to exclude, from the extracted 100 functions, tasks which have less overlap in menu items necessary to be performed for achieving a function and are considered easy for anyone to accomplish. It was also determined that the selection record data collection would end when any one of the following three end conditions was met:

TABLE 1

Experimental Tasks

| task | Task Instruction Statements |
|---|---|
| 1 | Set scheduled recording from 7:03 to 8:05 pm today (on any channel). |
| 2 | Set scheduled recording for a program featuring Mr. ***. |
| 3 | Change to channel "NHK Hi-Vision" on BS system. |
| 4 | Dub a program called "***" recorded on hard disk onto DVD. |
| 5 | Delete a program called "###" recorded on hard disk. |
| 6 | Terrestrial digital broadcast and BS digital broadcast have subtitles. Change currently-set Japanese substitles to English subtitles. |
| 7 | Audio of DVD is Japanese Change audio to English and subtitles to Japanese. |
| 8 | Correct DVD recorder clock. |

The subjects judged that they have accomplished the task (end condition 1).

The subjects gave up the task (end condition 2).

After a lapse of a certain time, the experiment staff judged that there is no prospect of task accomplishment (end condition 3).

As a result of the experiment, while eight tasks were prepared for the six subjects, obtained was 43 pieces of selection record data due to the experiment time and so on. Table 2 shows the number of tasks executed and the average number of trials according to the experiment. The "Achieved Case" means a case where the data collection ended due to the end condition 1, and the "Unachieved Case" means a case where the data collection ended due to the end condition 2 or 3.

Further, the "number of trials" means the number of times the user retried the same search by returning to a higher level because descending the menu levels did not lead to the target function.

TABLE 2

Number of Tasks Executed and Average Number of Trials

|  | Number of Tasks Executed | Average Number of Trials |
|---|---|---|
| Total | 43 | 4.0 |
| Achieved Case | 28 | 2.7 |
| Unachieved Case | 15 | 6.3 |

(Result of Evaluation Experiment: Conventional Technique)

First, for each of the 100 functions extracted from the operating instruction as the target function candidates, words centering on nouns and verbs were extracted (368 types) from the category names and the titles in the table of contents and a set of documents (considering a function description as one document), by applying a Japanese morphological analysis system ChaSen (chasen-2.4.2-1-ipadic-sjis-2.7.0) (Non Patent Literature: "ChaSen Morphological Analyzer" [online] 2007, Nara Institute of Science and Technology, [searched on Aug. 7, 2008], Internet <URL:http://chasen-legacy.sourceforge.jp/>). Further, a term-document matrix was created using appearance frequency information (TF-IDF (term frequency-inverse document frequency) value) of the extracted words in each document. The created term-document matrix was put through singular value decomposition and 80-dimensional compression (this matrix is hereinafter referred to as "semantic space") (Non Patent Literature: Tokunaga, "Information Retrieval and Natural Language Processing", University of Tokyo Press, 1999, pp. 32-33, pp. 73-77).

Next, to calculate, using the created semantic space, a similarity between the selection records and each of the target function candidates, it is necessary to determine which selection records should be used for inferring the target function. In actual use, the target function is inferred using selection records which indicate the user's operations performed prior to the timing with which the user makes an operation support request, in need of operation support. However, the selection record collection experiment did not collect the timing with which the user needed the operation support. Further, since the target function is inferred using the selection records, too small the number of types of selected menu items in the selection records leads to deterioration in the accuracy of the target function inference. In view of the above, since the selection record data shows that the average number of trials conducted for the achieved cases was 2.7, it is assumed that the user needs support when the user is unable to access the target function within three trials. Based on that assumption, 19 pieces of data indicating the cases where the user conducted three or more trials (9 achieved cases, 10 unachieved cases) were used for the evaluation of the target function inference. The calculation for the target function inference was performed every time input was received from the user, and a similarity was calculated between a word included in the items selected thus far and the target function candidates. The target function candidates ranked in descending order of the similarity are used as the result of the target function inference so as to evaluate the rank of the correct target function among all the 100 functions at the end of three trials.

Table 3 shows the evaluation result. Each of the numbers in the table is the ranking of the correct target function in the inference result. For example, when a target function was inferred using selection records (at the end of three trials) of the subject 1 who attempted to accomplish the task 1, the ranking of the correct target function in the inference result was third. As a result of the evaluation experiment, the average ranking of the correct target functions was 15.7 in the inference result, and the percentage of the correct target functions in the top 10 functions in the inference result was 52.6% and the percentage of the correct target functions in the top 20 functions in the inference result was 73.7%. The task 8 shown in Table 1 is excluded from the following examination of the experiment result, because the task 8 was an "achieved case" for all of the subjects.

TABLE 3

Target Function Inference Result (Conventional Technique)

|  | task 1 | task 2 | task 3 | task 4 | task 5 | task 6 | task 7 |
|---|---|---|---|---|---|---|---|
| Subject 1 | 3 |  | 37 ▲ |  |  | 8 ▲ |  |
| Subject 2 |  |  |  | 10 |  | 17 ▲ | 12 ▲ |
| Subject 3 |  | 8 | 1 |  |  | 38 ▲ | 12 ▲ |
| Subject 4 | 6 ▲ |  | 12 | 40 ▲ |  |  |  |
| Subject 5 |  | 48 ▲ | 1 |  | 30 | 9 | 12 |
| Subject 6 | 5 |  |  |  |  |  |  |

(Difference in Inference Accuracy Depending on Operation Strategy)

To observe deterioration in accuracy of the target function inference caused by a difference in operation strategy, the selection records obtained from the evaluation experiment were classified into function-selection-driven selection records and content-selection-driven selection records. The result is shown with triangles in Table 3. Whether or not the selection records are the content-selection-driven selection records was automatically determined using the technique described in the above embodiment. More specifically, the user's operation strategy was determined as the content-selection-driven operation strategy in the case where the screen information obtained from the user's operation records indicates that the user is performing a particular operation on a screen on which content is the operation target.

Table 4 shows the number of pieces of selection record data and the average ranking of the correct target functions in the inference result, for each operation strategy. From Table 4, it is possible to observe that the accuracy of the target function inference using the content-selection-driven selection records is lower than the accuracy of the target function inference using the function-selection-driven selection records.

TABLE 4

Average Ranking for Each Operation Strategy

|  | Number of Pieces of Data | Average Ranking |
|---|---|---|
| Function-Selection Driven | 10 | 8.1 |
| Content-Selection Driven | 9 | 24.2 |

As shown above, the inference accuracy tends to deteriorate under influence of the user's operation strategy in the case where the target function is inferred using a conventional technique with all the selection record data. In order to stably achieve accurate inference without influence of the user's operation strategy, it is necessary to determine the user's operation strategy and infer the target function using a technique suited to the determined operation strategy.

(Result of Evaluation Experiment: Proposed Technique)

Evaluation was conducted on the target function inference which was performed using the same selection record data as that in the previous experiment and the technique described in the above embodiment. Table 5 shows the evaluation result. Each of the numbers in the table is the ranking of the correct target function in the inference result. The number in the parentheses represents the ranking of the correct target function according to the inference performed using a conventional technique based on a label-following strategy.

TABLE 5

Target Function Inference Result (Conventional Technique)

|  | task 1 | task 2 | task 3 | task 4 | task 5 | task 6 | task 7 |
|---|---|---|---|---|---|---|---|
| Subject 1 | 3 |  | 10 (37) |  |  | 2 (8) |  |
| Subject 2 |  |  |  | 10 |  | 1 (17) | 5 (12) |
| Subject 3 |  | 8 | 1 |  |  | 22 (38) | 5 (12) |
| Subject 4 | 3 (6) |  | 12 | 34 (40) |  |  |  |
| Subject 5 |  | 3 (48) | 1 |  | 30 | 9 | 12 |
| Subject 6 | 5 |  |  |  |  |  |  |

From this table, it is possible to observe that the accuracy of the target function inference in all the selection records improved as a result of the inference processing which was changed according to the proposed technique. For example, the ranking of the correct target function of the task 1 performed by the subject 4 rose from sixth to third. The average ranking of the correct target functions inferred using the content-selection-driven selection record data is 9.4, which indicates a significant improvement from the average ranking of 24.2 obtained through the inference by the conventional technique using the same selection record data. Further, there is only a small difference from 8.1 that is the average ranking of the correct target functions inferred using the function-selection-driven selection record data. Based on this result, it is possible to say that the proposed technique has enabled the inference without being under a significant influence of the user's operation strategy. Furthermore, the average ranking of the correct target functions in the inference result was 8.7 when the inference was performed using all the selection record data with the proposed technique, which shows an accuracy almost twice higher than in the conventional technique according to which the average ranking of the correct target functions in the inference result was 15.7. This confirmed the effectiveness of the present technique.

Although the operation support apparatus according to an embodiment of the present invention has been described thus far, the present invention is not limited to such embodiment.

For example, the above-described operation support apparatus may be specifically configured as a computer system which includes a microprocessor, a ROM, a RAM, a hard disk drive, a display unit, a keyboard, a mouse, and so on. A computer program is stored in the RAM or the hard disk drive. As the microprocessor operates according to the computer program, the operation support apparatus implements its function. Here, the computer program is a combination of several instruction codes indicating commands for a computer to perform in order to implement a predetermined function.

The constituent elements of the above-described operation support apparatus may be partially or entirely configured as a single system Large Scale Integration (LSI). The system LSI is a super-multifunctional LSI manufactured as one chip on which multiple constituent elements are integrated. More specifically, it is a computer system including a microprocessor, a ROM, a RAM, and so on. A computer program is stored in the RAM. As the microprocessor operates according to the computer program, the system LSI implements its function.

Further, the constituent elements of the above-described operation support apparatus may be partially or entirely configured as a single module or an IC card insertable to the operation support apparatus. The IC card or the module is a computer system including a microprocessor, a ROM, a RAM, and so on. The IC card or the module may include the above-described super-multifunctional LSI. As the microprocessor operates according to the computer program, the IC card or the module implements its function. The IC card or the module may be tamper-resistant.

The present invention may be implemented as the above-described methods. In addition, the present invention may be implemented as a computer program which causes a computer to execute such methods or as a digital signal which includes the above-mentioned computer program.

In addition, the present invention may also be implemented as a computer-readable recording medium on which the above-mentioned computer program or digital signal is recorded. For example, the present invention may be implemented as a flexible disk, a hard disk, a CD-ROM, an MO, a DVD, a DVD-ROM, a DVD-RAM, a BD (Blu-ray disc®), a semiconductor memory, or the like on which the above-mentioned computer program or digital signal is recorded. Further, the present invention may be implemented as the above-mentioned digital signal recorded on these recording media.

Furthermore, the present invention may be implemented as a transmission device which transmits the above-mentioned computer program or digital signal via a telecommunication line, a wireless or wired communication line, a network represented by the Internet, a data broadcast, and so on.

Moreover, the present invention may be implemented as a computer system including a microprocessor and a memory, whereby the above-mentioned computer program is stored in the memory, and the microprocessor operates according to the computer program stored in the memory.

In addition, the above-mentioned program or digital signal recorded on the recording medium described above may be transmitted to another independent computer system, so that the present invention can be implemented by the other independent computer system. Alternatively, the above-mentioned program or digital signal may be transmitted to another independent computer system via the network or the like described above, so that the present invention can be implemented by the other independent computer system.

In addition, the above embodiment and variations may be combined.

The above embodiment has been described as an example in all aspects, and should not be understood as limiting the present invention. The scope of the present invention is indicated by not the above description but the Claims, and is intended to include all modifications within the meanings and a scope equivalent to the Claims.

INDUSTRIAL APPLICABILITY

The present invention is applicable to appliances in general that are: operated by a user pressing buttons on a screen which are assigned with menu items or levels; provided with a selection-style interface for achieving an object; and used for operating content. Thus, the present invention is applicable not only to recording appliances as described in the above embodiment but also to various appliances, including audio and video playback/recording appliances and terminals having functions of audio and video playback/recording appliances, such as car navigation systems. Thus, the industrial applicability of the present invention is significant.

REFERENCE SIGNS LIST

300 Operation support apparatus
301 Input unit
302 Recording appliance operation execution unit
303 Operation record storage unit
304 Timer
305 Operation strategy determination unit
306 Content inference unit
307 Operation target information storage unit
308 Target function inference unit
309 Target function candidate storage unit
310 Operation support determination unit
311 Output unit

The invention claimed is:

1. An operation support apparatus which provides a user with operation support by inferring a target function of the user which is to be executed on an appliance that processes content, said operation support apparatus comprising:
   an operation record storage unit in which an operation record is stored, the operation record including an operation performed by the user on the appliance;
   a target function candidate storage unit in which functions of the appliance are stored;
   an operation strategy determination unit configured to determine on which one of operation strategies the operation on the appliance included in the operation record stored in said operation record storage unit is based on, the operation strategies having mutually different selection bases on which the user has focused in selecting the operation on the appliance;
   a target function inference unit configured to infer, with reference to the functions of the appliance stored in said target function candidate storage unit, the target function of the user according to a target function inference method suited to the operation strategy determined by said operation strategy determination unit; and
   an operation support determination unit configured to determine an operation support method which allows the user to achieve the target function inferred by said target function inference unit, and to provide the user with operation support according to the determined operation support method.

2. The operation support apparatus according to claim 1, wherein said operation strategy determination unit is configured to determine whether or not the operation record stored in said operation record storage unit includes an operation performed on the appliance according to a content-selection-driven operation strategy or an operation performed on the appliance according to a function-selection-driven operation strategy, so as to determine whether the operation strategy of the user in operating the appliance is the content-selection-driven operation strategy or the function-selection-driven operation strategy, the content-selection-driven operation strategy originating from content selection, and the function-selection-driven operation strategy originating from function selection.

3. The operation support apparatus according to claim 2, wherein the operation record stored in said operation record storage unit further includes a status of the appliance when the appliance was operated, said operation support apparatus further comprises
an operation target information storage unit in which an association between the status of the appliance and an operation target associated with the status of the appliance is stored, and
said operation strategy determination unit is configured to determine, with reference to the association stored in said operation target information storage unit, that the operation strategy of the user in operating the appliance is the content-selection-driven operation strategy when content is included as the operation target associated with the status of the appliance included in the operation record.

4. The operation support apparatus according to claim 2, wherein said operation strategy determination unit is configured to extract a particular word or phrase from a sentence describing an operation which was performed by the user on the appliance and is included in a predetermined operation record stored in said operation record storage unit, and to determine that the operation strategy of the user in operating the appliance is the function-selection-driven operation strategy when a ratio of the number of the extracted particular word or phrase to the number of the predetermined operation record is equal to or larger than a predetermined threshold.

5. The operation support apparatus according to claim 4, wherein said operation strategy determination unit is configured to extract a morpheme of a particular word class by performing a morphological analysis on the sentence describing the operation which was performed by the user on the appliance and is included in the predetermined operation record stored in said operation record storage unit, and to determine that the operation strategy of the user in operating the appliance is the function-selection-driven operation strategy when a ratio of the number of the extracted morpheme of the particular word class to the number of the predetermined operation record is equal to or larger than a predetermined threshold.

6. The operation support apparatus according to claim 2, wherein said operation strategy determination unit is configured to extract a particular word or phrase from a sentence describing an operation which was performed by the user on the appliance and is included in a predetermined operation record stored in said operation record storage unit, and to determine that the operation strategy of the user in operating the appliance is the function-selection-driven operation strategy when an appearance frequency of the extracted particular word or phrase in a manual of the appliance is equal to or higher than a predetermined threshold.

7. The operation support apparatus according to claim 6, wherein said operation strategy determination unit is configured to extract a morpheme of a particular word class by performing a morphological analysis on the sentence describing the operation which was performed by the user on the appliance and is included in the predetermined operation record stored in said operation record storage unit, and to determine that the operation strategy of the user in operating the appliance is the function-selection-driven operation strategy when an appearance frequency of the extracted morpheme of the particular word class in the manual of the appliance is equal to or higher than a predetermined threshold.

8. The operation support apparatus according to claim 2, wherein, when the operation strategy determined by said operation strategy determination unit is the function-selection-driven operation strategy and a word included in the operation record stored in said operation record storage unit is used for describing an action of a function stored in said target function candidate storage unit, said target function inference unit is configured to highly rank, as the target function of the user, the function having the action described using the word.

9. The operation support apparatus according to claim 2, wherein the operation record stored in said operation record storage unit further includes a status of the appliance when the appliance was operated,
said operation support apparatus further comprises:
an operation target information storage unit in which an association between the status of the appliance and a type of content is stored, the content being an operation target associated with the status of the appliance; and
a content inference unit configured to infer a type of content from which the operation by the user has originated, based on the status of the appliance included in the operation record stored in said operation record storage unit and on the association stored in said operation target information storage unit, when said operation strategy determination unit determines that the operation strategy of the user in operating the appliance is the content-selection-driven operation strategy, and
when the operation strategy determined by said operation strategy determination unit is the content-selection-driven operation strategy, said target function inference unit is configured to infer the target function of the user by using the type of content inferred by said content inference unit and the functions stored in said target function candidate storage unit.

10. The operation support apparatus according to claim 9, wherein each of the functions of the appliance is stored in said target function candidate storage unit in association with a type of content that is an operation target associated with the function, and
when the operation strategy determined by said operation strategy determination unit is the content-selection-driven operation strategy, said target function inference unit is configured to infer the target function of the user from among functions which are among the functions stored in said target function candidate storage unit and are associated with, as the operation target, content of a same type as the type of content inferred by said content inference unit.

11. The operation support apparatus according to claim 10, wherein operation records stored in said operation record storage unit including the operation record are grouped according to a predetermined method,
said operation strategy determination unit is configured to determine the operation strategy on a group-by-group basis,
said content inference unit is configured to infer the type of content on a group-by-group basis, and
for a group of operation records which are among the operation records stored in said operation record storage unit and were used by said operation strategy determination unit for determining that the operation strategy is the content-selection-driven operation strategy, said target function inference unit is configured to (i) extract functions which are among the functions stored in said target function candidate storage unit and are associated with, as the operation target, content of a same type as the type of content inferred by said content inference unit, and (ii) infer the target function of the user from among the extracted functions using operation records used by said operation strategy determination unit for determining that the operation strategy is the function-selection-driven operation strategy.

12. The operation support apparatus according to claim 9, further comprising
a target content specialty determination unit configured to determine whether or not a function executable on the content from which the operation has originated is special to the user when the operation strategy determined by said operation strategy determination unit is the content-selection-driven operation strategy,
wherein, when the operation strategy determined by said operation strategy determination unit is the content-selection-driven operation strategy and said target content specialty determination unit determines that the function executable on the content from which the operation has originated is special, said target function inference unit is configured to infer the target function of the user with a higher rank given to the function determined as special.

13. The operation support apparatus according to claim 12, wherein said target content specialty determination unit is configured to determine whether or not the function executable on the content from which the operation has originated is executable on other content displayed on a same screen as the content from which the operation has originated, and to determine that the function is special when a ratio of said other content on which the function is executable to all of said other content is equal to or smaller than a predetermined threshold.

14. The operation support apparatus according to claim 12, wherein said target content specialty determination unit is configured to determine whether or not the function executable on the content from which the operation has originated is executable on other content on which another function has been executed within a predetermine time period, and to determine that the function is special when a ratio of said other content on which the function is executable to all of said other content is equal to or smaller than a predetermined threshold.

15. The operation support apparatus according to claim 1, wherein said operation support determination unit is further configured to change the operation support method according to the operation strategy determined by said operation strategy determination unit.

16. An operation support method of providing a user with operation support by inferring a target function of the user which is to be executed on an appliance that processes content, said operation support method comprising:
determining on which one of operation strategies an operation which was performed by the user on the appliance and is included in an operation record stored in an operation record storage unit is based, the operation strategies having mutually different selection bases on which the user has focused in selecting the operation on the appliance;
inferring, with reference to functions of the appliance stored in a target function candidate storage unit, the target function of the user according to a target function inference method suited to the operation strategy determined in said determining of an operation strategy; and
determining an operation support method which allows the user to achieve the target function inferred in said inferring, and providing the user with operation support according to the determined operation support method.

17. A non-transitory computer-readable medium having recorded thereon a program for providing a user with operation support by inferring a target function of the user which is to be executed on an appliance that processes content, said program causing a computer to execute:
determining on which one of operation strategies an operation which was performed by the user on the appliance and is included in an operation record stored in an operation record storage unit is based, the operation strategies having mutually different selection bases on which the user has focused in selecting the operation on the appliance;
inferring, with reference to functions of the appliance stored in a target function candidate storage unit, the target function of the user according to a target function inference method suited to the operation strategy determined in the determining of an operation strategy; and
determining an operation support method which allows the user to achieve the target function inferred in the inferring, and providing the user with operation support according to the determined operation support method.

* * * * *